United States Patent [19]
Plotner et al.

[11] Patent Number: 6,142,255
[45] Date of Patent: *Nov. 7, 2000

[54] LADDER, MEMBER FOR CONNECTING A RAIL TO A HORIZONTAL ELEMENT OF A LADDER, AND METHOD

[75] Inventors: David E. Plotner; Edward E. Heald; Richard P. Sulecki; Frederick J. Bartnicki; Mitchell H. Hetrich, all of Greenville, Pa.

[73] Assignee: Werner Co., Greenville, Pa.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/869,494

[22] Filed: Jun. 5, 1997

Related U.S. Application Data

[63] Continuation of application No. 08/272,154, Jul. 8, 1994, Pat. No. 5,636,706.

[51] Int. Cl.⁷ ...................................................... E06C 7/10
[52] U.S. Cl. ........................................... 182/120; 182/217
[58] Field of Search ..................................... 182/217, 220

[56] References Cited

U.S. PATENT DOCUMENTS

| | | | |
|---|---|---|---|
| 502,967 | 8/1893 | Hetrick | 182/217 |
| 2,385,171 | 9/1945 | Yarder | 182/217 |
| 3,005,513 | 10/1961 | Larson | 182/217 |
| 4,049,082 | 9/1977 | Reid | 182/217 |
| 4,834,216 | 5/1989 | Wallick | 182/46 |
| 4,949,811 | 8/1990 | Bailey | 182/220 |
| 5,131,495 | 7/1992 | Bartnicki | 182/219 |

*Primary Examiner*—Alvin Chin-Shue
*Attorney, Agent, or Firm*—Ansel M. Schwartz

[57] ABSTRACT

A member for connecting a rail to a horizontal element of a ladder. The member comprises a first portion that connects to the horizontal member. The member also comprises a second portion which connects to the rail and extends essentially in parallel with the rail. The second portion is integrally connected to the first portion such that the first portion and the second portion are one continuous piece. The second portion is in an angular relationship of less than 90° with the first portion. A member for connecting a rail having a first rail flange and a second rail flange to a horizontal element of a ladder. The member comprises a first arm which connects to the first rail flange and the horizontal member. The member is also comprised of a second arm which connects to the second rail flange and the horizontal member. Additionally, the member comprises a central body which is integrally connected to the second arm and the first arm. The first arm, second arm and central body are one continuous piece, preferably of plastic. A ladder comprised of the member for each rail. A method for using a ladder. The method comprises the steps of placing a load on the ladder. Next there is the step of transferring forces generated from the load to a member connected between a rail of the ladder and a first step of the ladder.

21 Claims, 26 Drawing Sheets

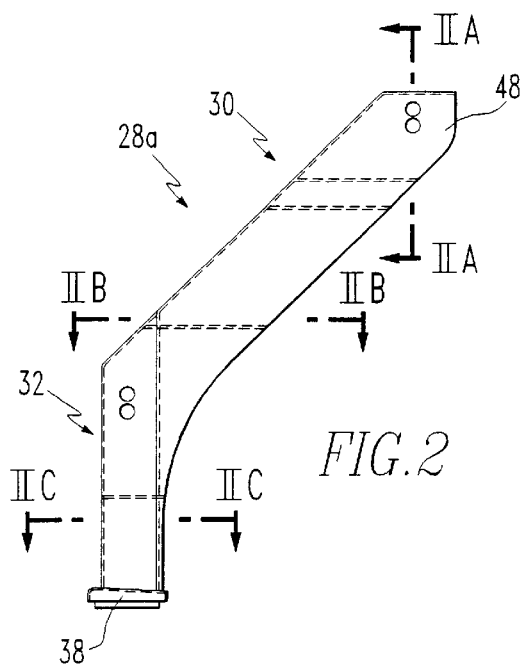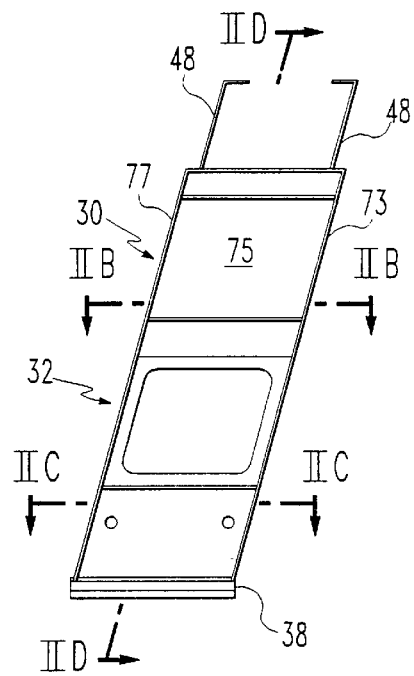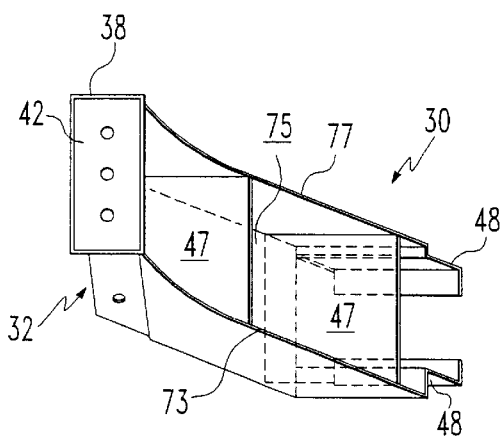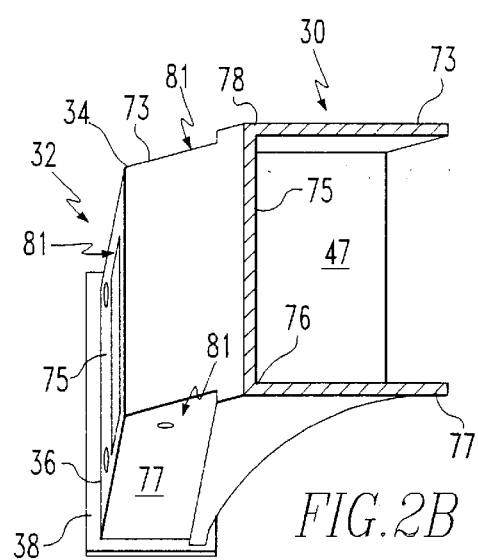

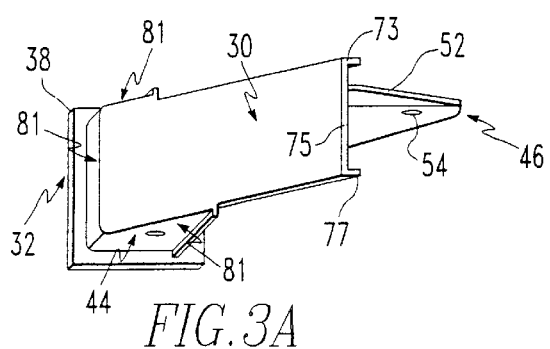
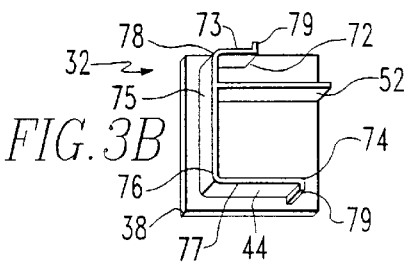
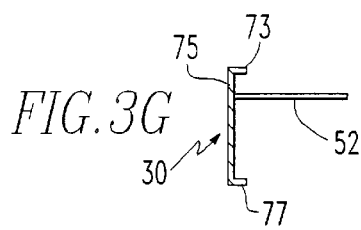
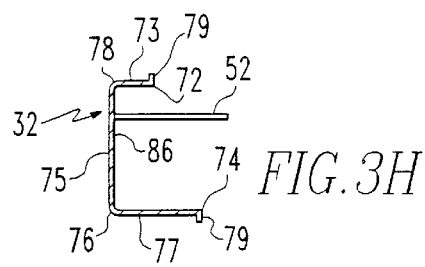
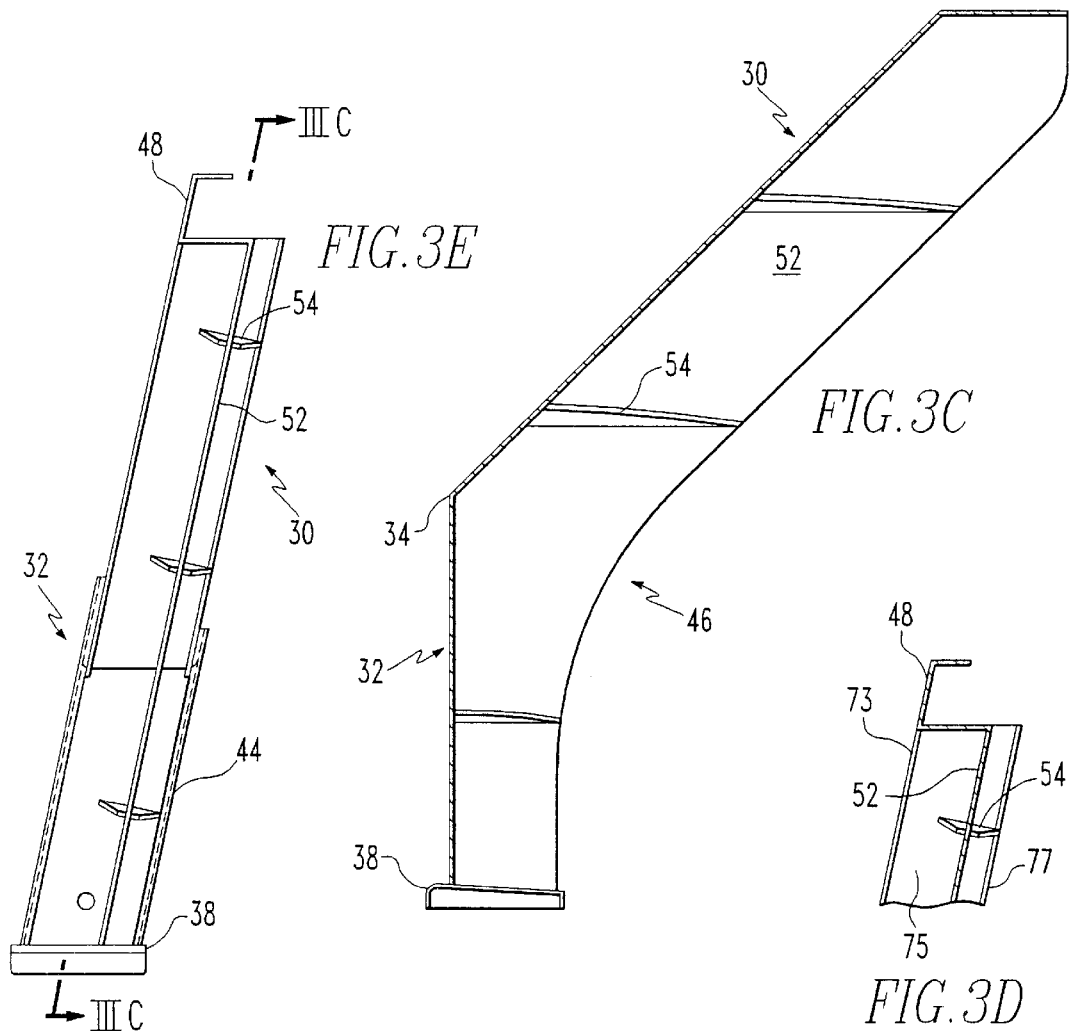

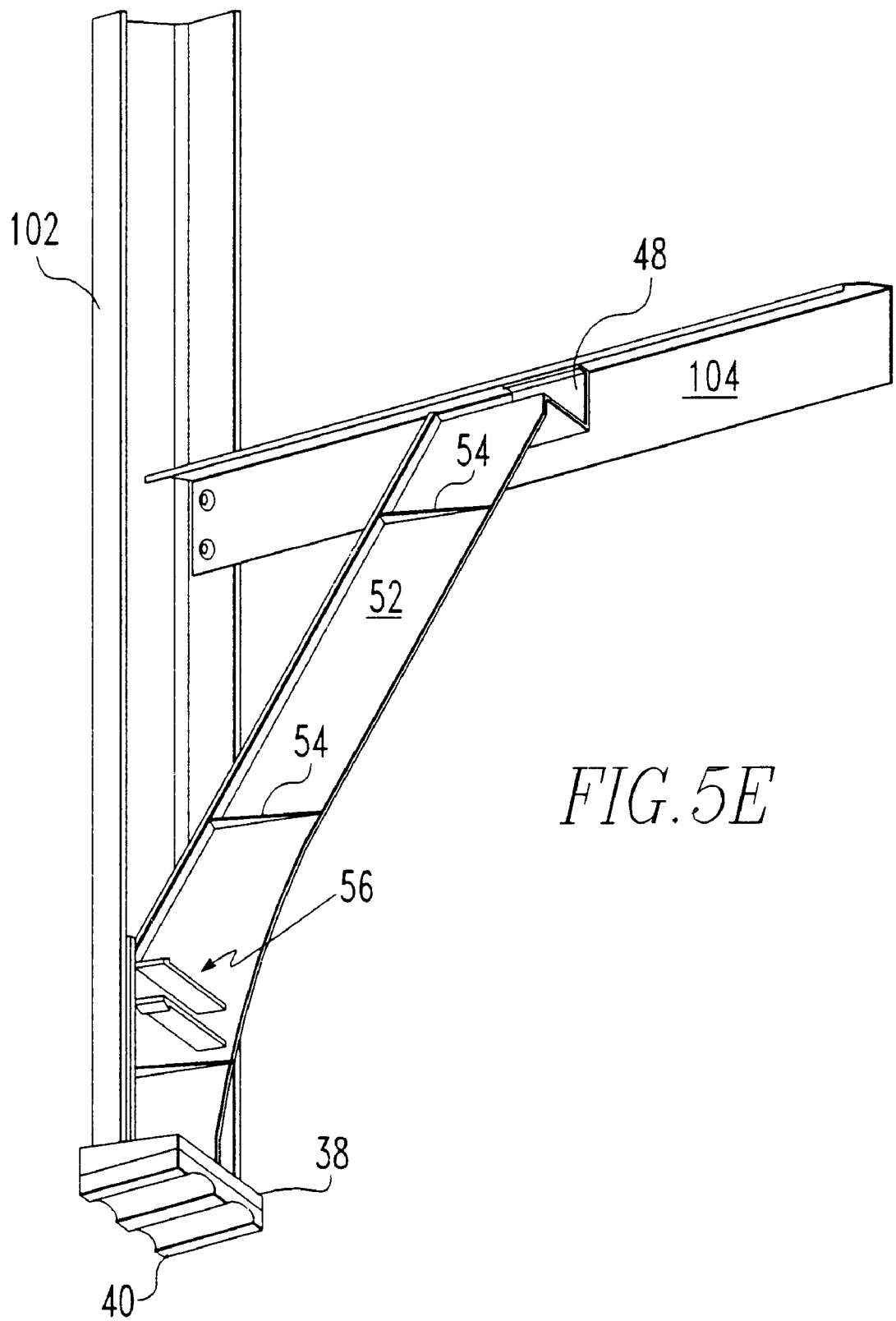

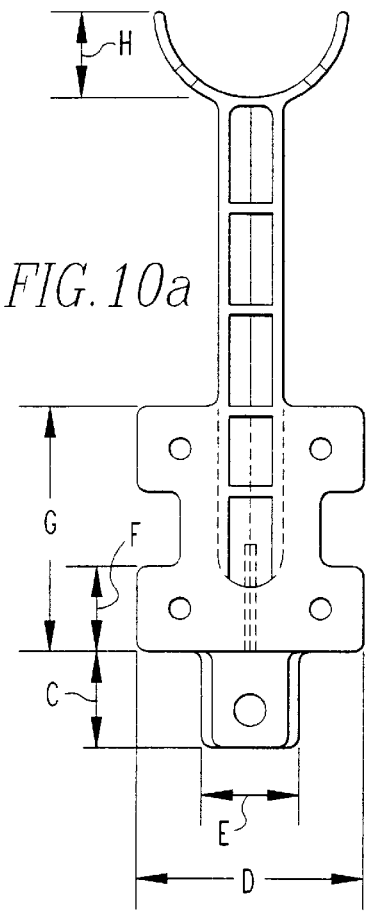
FIG.10a
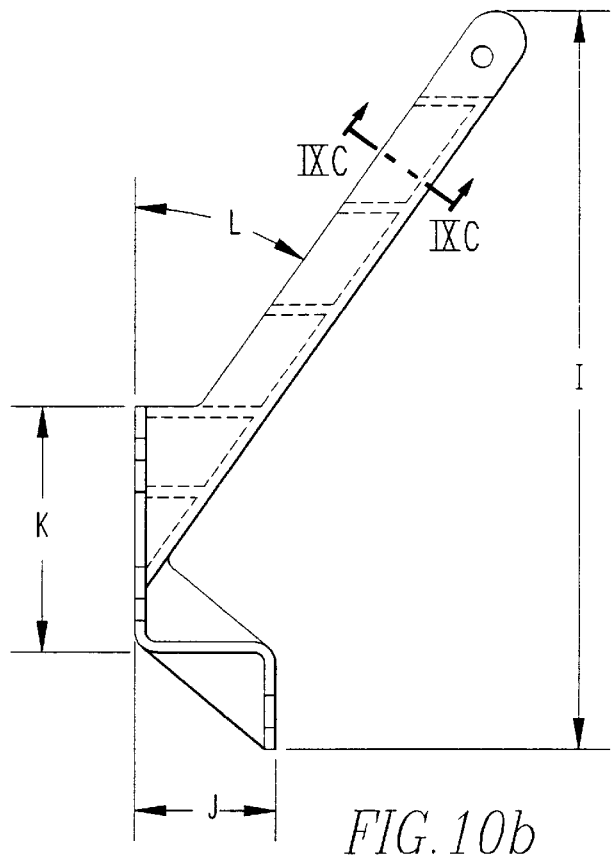
FIG.10b
FIG.10c 6,142,255

LADDER, MEMBER FOR CONNECTING A RAIL TO A HORIZONTAL ELEMENT OF A LADDER, AND METHOD

This is a continuation of application Ser. No. 08/272,154 filed on Jul. 8, 1994 U.S. Pat. No. 5,636,706, issued Jun. 10, 1997.

FIELD OF THE INVENTION

The present invention is related to ladders. More specifically, the present invention relates to a member for connecting a rail to a horizontal element, such as a step or a horizontal of a ladder.

BACKGROUND OF THE INVENTION

Ladders experience horizontal as well as vertical forces while they are used. To better respond to the horizontal forces that may be experienced by the ladder, knee braces have been used to connect the bottom step or horizontal with a rail. The present invention is directed to an improved knee brace that has been combined with a rail support and preferably a foot to better respond to horizontal forces, and increase manufacturing efficiency.

SUMMARY OF THE INVENTION

The present invention pertains to a ladder. The ladder comprises a first side rail. The ladder also comprises a second side rail essentially in parallel with and adjacent to the first side rail. Additionally, the ladder comprises a first step connected to the first side rail in proximity to its bottom and to the second side rail in proximity to its bottom. The first step is essentially perpendicular with the first and second side rails. There is a first front member for connecting a first rail to the first step and a second front member for connecting the second side rail to the first step. Each front member comprises a first portion that connects to the step. Each front member also comprises a second portion which connects to the rail and extends essentially in parallel with the rail of the ladder. The second portion is integrally connected to the first portion such that the first portion and the second portion are one continuous piece. The second portion is in an angular relationship of less than 90° with the first portion. The second portion has a contact surface which extends along and conforms with the rail to which it is attached so forces can be transferred therebetween.

The present invention also pertains to a member for connecting a rail to a horizontal element of a ladder. The member comprises a first portion that connects to the horizontal member. The member also comprises a second portion which connects to the rail and extends essentially in parallel with the rail. The second portion is integrally connected to the first portion such that the first portion and the second portion are one continuous piece. The second portion is in an angular relationship of less than 90° with the first portion. The second portion has a contact surface which extends along and conforms with the rail to which it is attached so forces can be transferred therebetween.

The present invention pertains to a member for connecting a rail having a first rail flange and a second rail flange to a horizontal element of a ladder. The member comprises a first arm which connects to the first rail flange and the horizontal member. The member is also comprised of a second arm which connects to the second rail flange and the horizontal member. Additionally, the member comprises a central body which is integrally connected to the second arm and the first arm. The first arm, second arm and central body are one continuous piece, preferably of plastic. The second portion has a contact surface which extends along and conforms with the rail to which it is attached so forces can be transferred therebetween.

The present invention also pertains to a method for using a ladder. The method comprises the steps of placing a load on the ladder. Next there is the step of transferring forces generated from the load to a member connected between a rail of the ladder and a first step of the ladder. The member has a first portion that connects to the horizontal element. The member also has a second portion which connects to the rail and extends essentially in parallel with the rail of the ladder. The second portion is integrally connected to the first portion such that the first portion and second portion are one continuous piece. The second portion is in an angular relationship of less than 90° with the first portion. The second portion has a contact surface which extends along and conforms with the rail to which it is attached so forces can be transferred therebetween.

BRIEF DESCRIPTION OF THE DRAWINGS

In the accompanying drawings, the preferred embodiment of the invention and preferred methods of practicing the invention are illustrated in which:

FIGS. 2, 2a, 2b, 2c, 2d, 2e and 2f are various schematic representations of a front member of the present invention.

FIGS. 3, 3a, 3b, 3c, 3d, 3e, 3f, 3g and 3h are various schematic representations of a rear member of the present invention.

FIGS. 5d and 5e are schematic representations of a front view and an underside projected view, respectively, of yet another embodiment of a member connected to a side rail and a horizontal member.

FIGS. 10a, 10b and 10c are schematic representations of a member of the present invention for nonsupporting ladders.

DESCRIPTION OF THE PREFERRED EMBODIMENT

Figure 1:
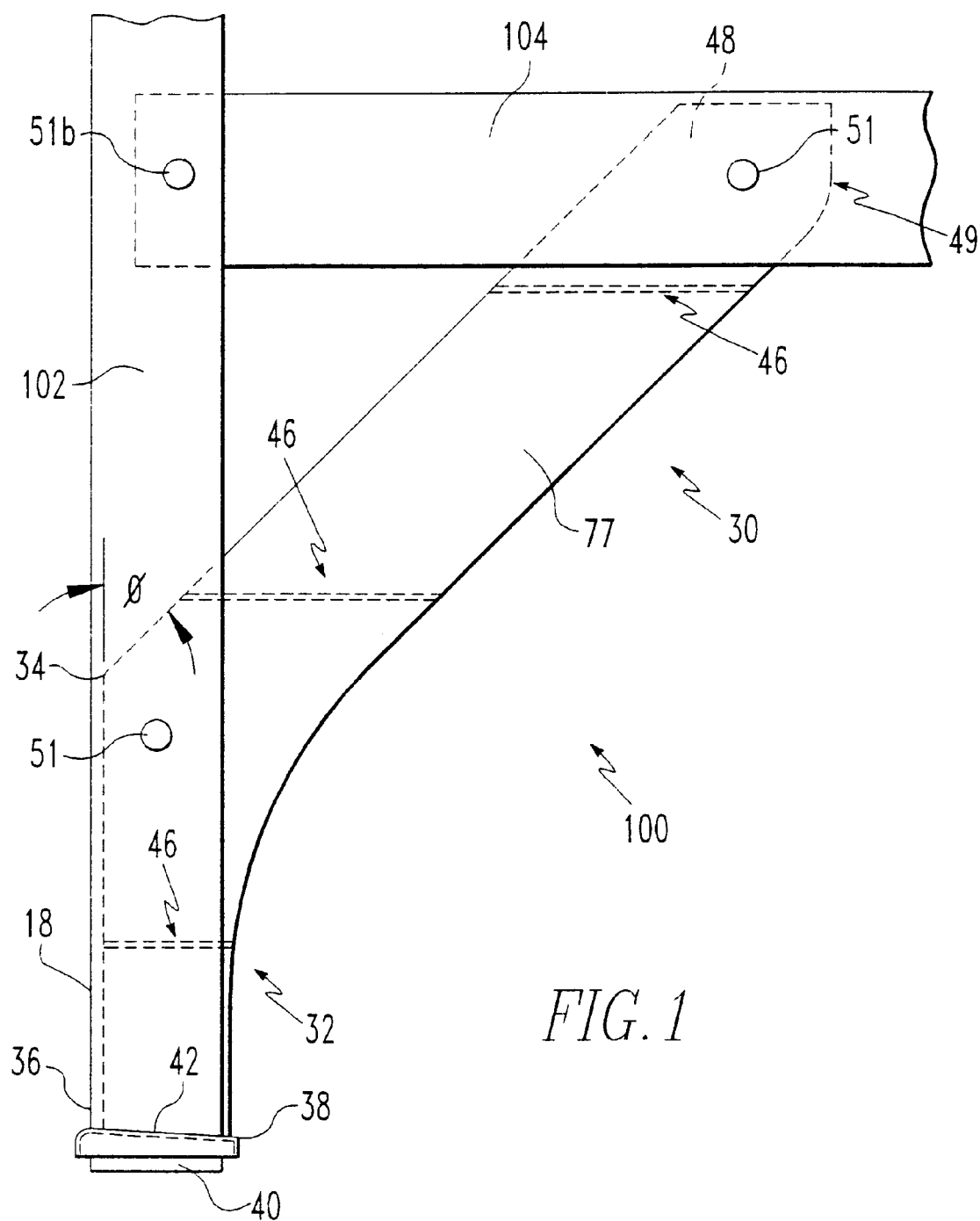
FIG. 1 is a schematic representation of a member of the present invention connecting a rail to a horizontal element.

Referring now to the drawings wherein like reference numerals refer to similar or identical parts throughout the several views, and more specifically to FIG. 1 thereof, there is shown a member 100 for connecting a rail 102 to a horizontal element 104, such as a step or a horizontal, of a ladder. The member 100 comprises a first portion 30 that connects to the horizontal member 104. Preferably, the first portion 30 includes a flange portion 48 which connects to the horizontal member 104. Additionally, the member 100 comprises a second portion 32 which connects to the side rail 102 and extends essentially in parallel with the side rail 102. The second portion 32 is integrally connected to the first portion 30 such that the first portion 30 and second portion 32 are one continuous piece. The second portion 32 is in an angular relationship of less than 90° with the first portion 30. Preferably, the first portion 30 forms an angle θ of 30–60° and preferably 42° with the second portion 32.

The second portion 32 preferably has a first end 34 connected to the first portion 30 and a second end 36. Preferably, the member 100 includes a foot 38 integrally connected to the second end 36 of the second portion 32 to form one continuous piece therewith. Preferably, the foot 38 is angled to be disposed flat relative to the ground when the rail 102 to which it is attached is in an operable position. The foot 38 is disposed to receive the bottom 18 of the side rail 102 so weight on the side rail 102 is transferred to the foot 38 of the second portion 32 when the rail 102 is in an operable position. Preferably, the first portion 30, second portion 32 and foot 38 are one continuous piece of plastic, but the material also could be metal, or a composite, such as graphite or fiberglass. The member 100 preferably includes a foot pad 40 which contacts the ground when the rail 102 to which the member 100 is attached is in an operable position. The foot pad 40 is attached to the bottom 42 of the foot 38. Preferably, the second portion 32 has a contact surface 44 which extends along and conforms with the rail 102 to which it is attached so forces can be transferred therebetween.

Figure 2A:
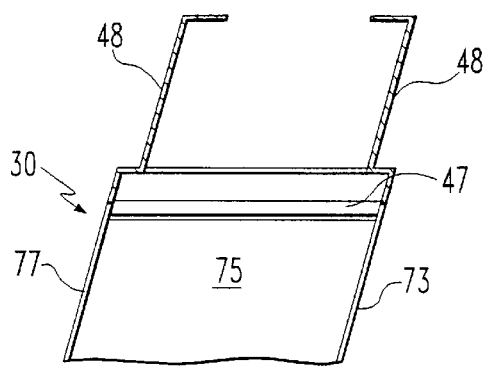
Figure 2D:
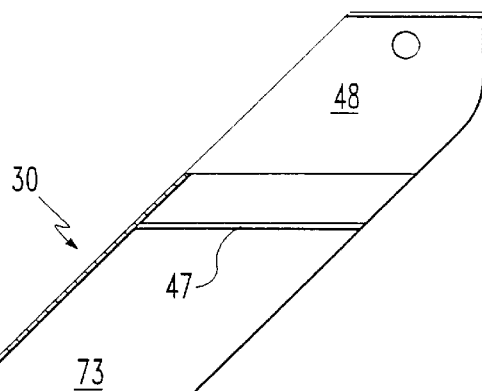
Figure 2D:
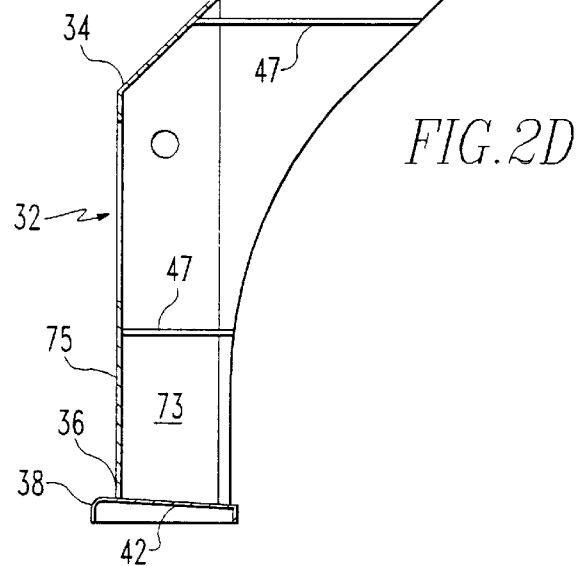
Figure 2C:
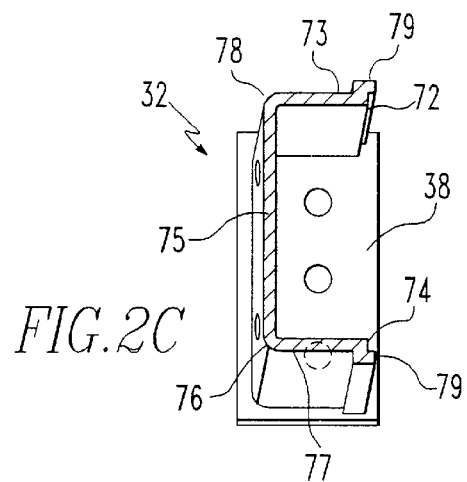

Preferably, the first portion 30 and second portion 32 include buttressing 46. In one embodiment, where the member 100 can be used on a front section 64 of a ladder 10, the first portion 30 and second portion 32 have a C-shaped cross section (although an appropriate structural configuration can be used), and the buttressing 46 includes cross plates 47 disposed in predetermined locations of the first and second portions, as shown in FIGS. 2, 2*a*, 2*b*, 2*c*, 2*d*, 2*e* and 2*f*. Preferably, the C-shaped cross section of the second portion 32 is comprised of a first arm 73, as shown in FIG. 2*c*. There is a central body 75 to which the first arm 73 is integrally connected at essentially a right angle. The C-shaped cross section of the second portion 32 is also comprised of a second arm 77 which is integrally connected at essentially a right angle to the central body 75 at its end 76 opposite the end 78 the first arm 73 is integrally connected to the central body 75. The first arm 73 and second arm 77 are essentially in parallel with each other. At the end 72 of the first arm 73 and the end 74 of the second arm 77 not connected to the central body 75, there is a second portion flange 79 which extends outward. The second portion flange 79 on the first arm 73 and the second arm 77, the first arm 73, the central body 75 and the second arm 77 define a channel 81, as shown in FIG. 2*b*, which receive the rail 102.

The C-shaped cross section of the first portion 30, as shown in FIG. 2*b*, has a first arm 73 integrally connected at essentially a right angle with a central body 75, and a second arm 77 integrally connected at essentially a right angle with the central body 75 at the end 76 opposite the end 78 of the central body 75 to which the first arm 73 is connected. The first arm 73 and the second arm 77 of the cross section of the first portion 30 are essentially in parallel. The flange portion 48 of the first portion 30 extends from the first arm 73 and second arm 77, as shown in FIG. 2*a*. The cross plates 47 are integrally connected with the first arm 73, central body 75 and second arm 77 and form one continuous piece with the first and second portions.

Figure 3:
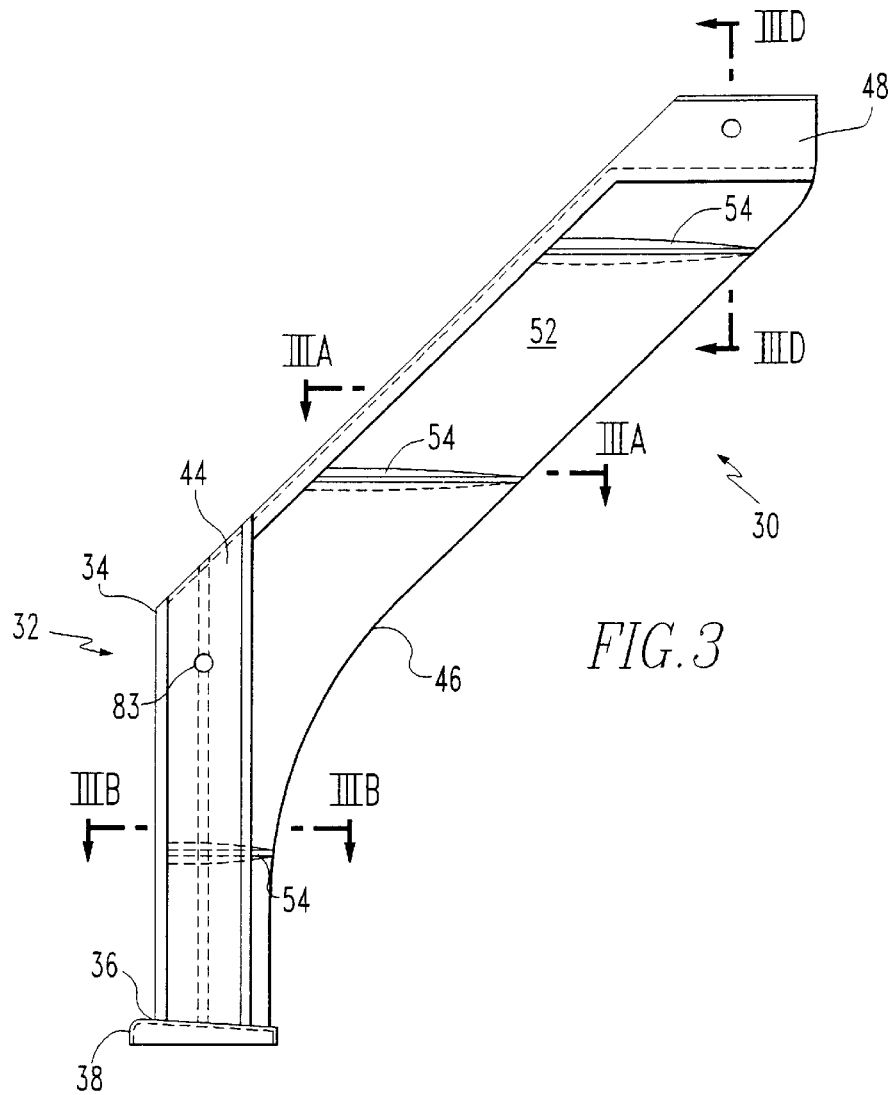
Figure 3F:
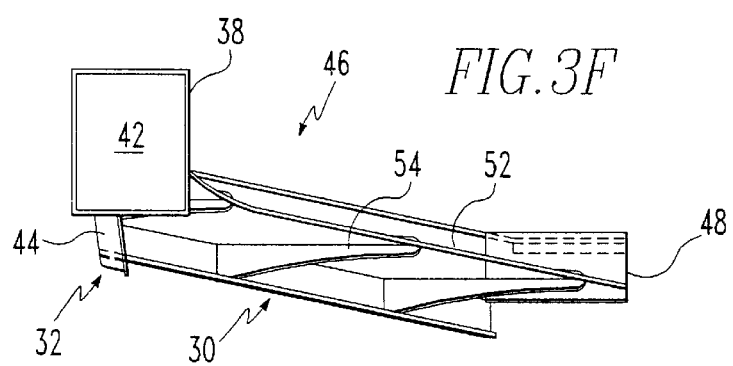
Figure 4:
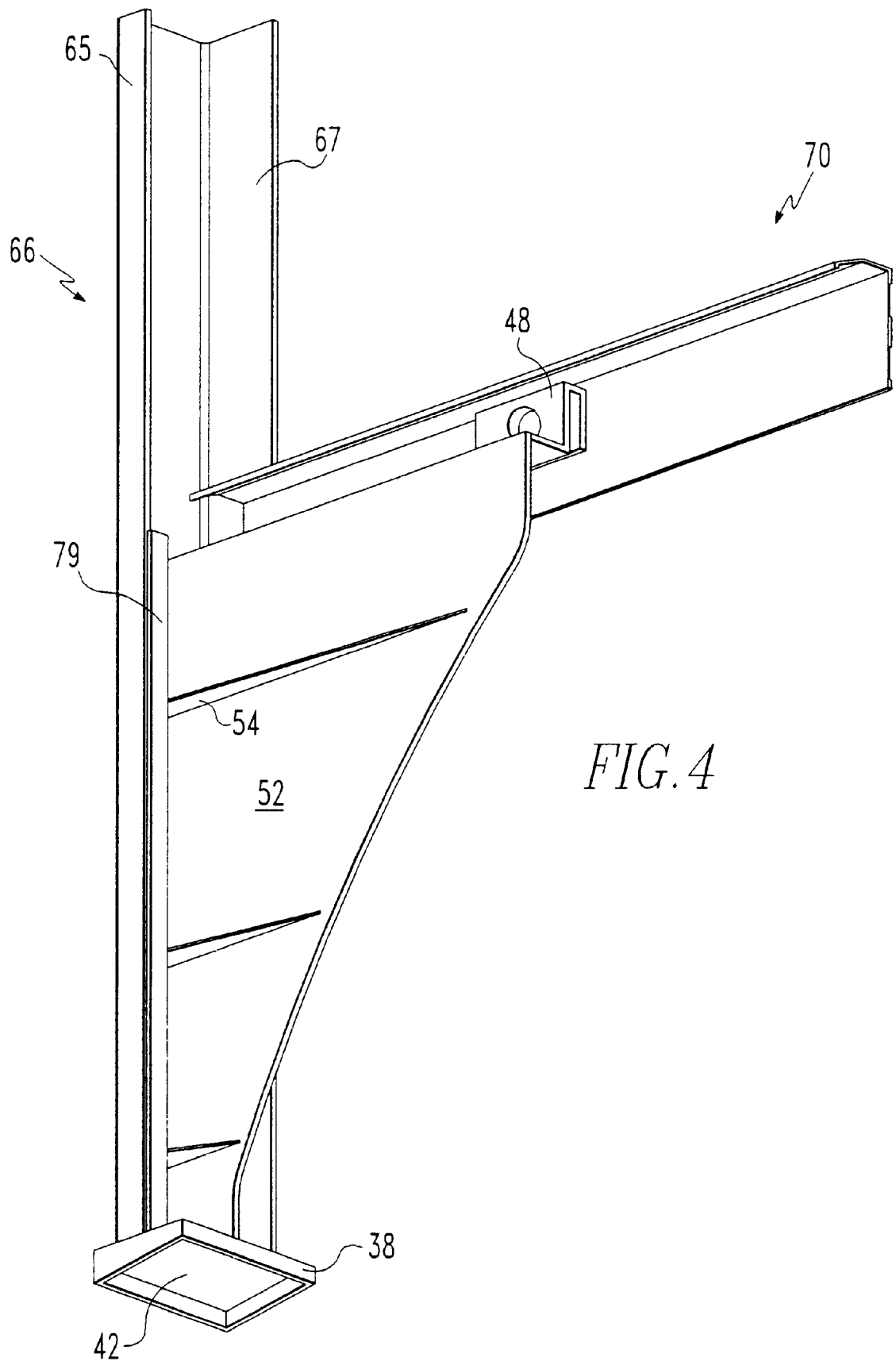
FIG. 4 is a schematic representation of an embodiment of a rear member connected to a horizontal and a rear side rail.

In another embodiment, as shown in FIGS. 3, 3*a*, 3*b*, 3*c*, 3*d*, 3*e*, 3*f*, 3*g* and 3*h*, the member 100 can be used on a rear section 74 of a ladder 10. In this embodiment, the first and second portions have a C-shaped cross section, and the buttressing 46 includes a rib 52 extending essentially the length of the member 100. The rib 52 has struts 54. The C-shaped cross section of the second portion 32 preferably has a first arm 73, as shown in FIGS. 3*b* and 3*h*. There is also a central body 75 integrally connected with the first arm 73 at one end 78 essentially at a right angle. The C-shaped cross section of the second portion 32 also comprises a second arm 77 integrally connected to the central body 75 at its end 76 opposite the end 78 of the central body 75 connected to the first arm 73. The second arm 77 essentially forms a right angle with the central body 75 and is essentially in parallel with the first arm 73. The first arm 73 is preferably of a shorter length than the second arm 77. The rib 52, struts 54, first arm 73, central body 75 and second arm 77 are one continuous piece. At the end 72 of the first arm 73 and the end 74 of the second arm 77 not connected to the central body 75, there is a second portion flange 79 that extends outward. The second portion flange 79 along with the second arm 77, first arm 73 and central body 75 define a channel 81, as shown in FIG. 3*a*, to which the rail 102 fits into and specifically contacts the contact surface 44 of the second portion 32. The rib 52 is connected to the central portion 75 offset from its center and closer to the first arm 73. This is because the rear side rail 66 to which the member 100 in this embodiment is connected is typically of a shape that has a first rail flange 65 that is of a shorter width than a second rail flange 67, as shown in FIG. 4. By offsetting the rib 52 in the manner described, it serves to better protect against twisting and failure of the member 100 and compensates for the structural configuration to which the member 100 is connected.

The C-shaped cross section of the first portion 30, as shown in FIGS. 3*a* and 3*g*, also has a first arm 73 integrally connected at essentially a right angle to a central portion 75 and a second arm 77 integrally connected at essentially a right angle to the central body 75 at the end 76 of the central body 75 opposite the end 78 to which the first arm 73 is connected to it. The first arm 73 and second arm 77 of the cross section of the first portion 30 are much smaller relative to the length of the first arm 73 and second arm 77 of the second portion 32. The rib 52 is also connected to the central body 75 offset from its center and closer to the first arm 73 in the same relation as in the second portion 32. The rib 52, struts 54, first arm 73, central body 75 and second arm 77 are one continuous piece. The flange portion 48 extends from the first arm 73.

Accordingly, the present invention pertains to a member 100 for connecting a rail 102 having a first rail flange 65 and a second rail flange 67 to a horizontal element 104 of a ladder. The member 100 comprises a first arm 73 which connects to the first rail flange 65 and the horizontal member 104. The member 100 is also comprised of a second arm 77 which connects to the second rail flange 67 and the horizontal member 104. Additionally, the member 100 comprises a central body 75 which is integrally connected to the second arm 77 and the first arm 73. The first arm 73, second arm 77 and central body 75 are one continuous piece, preferably of plastic.

Figure 5A:
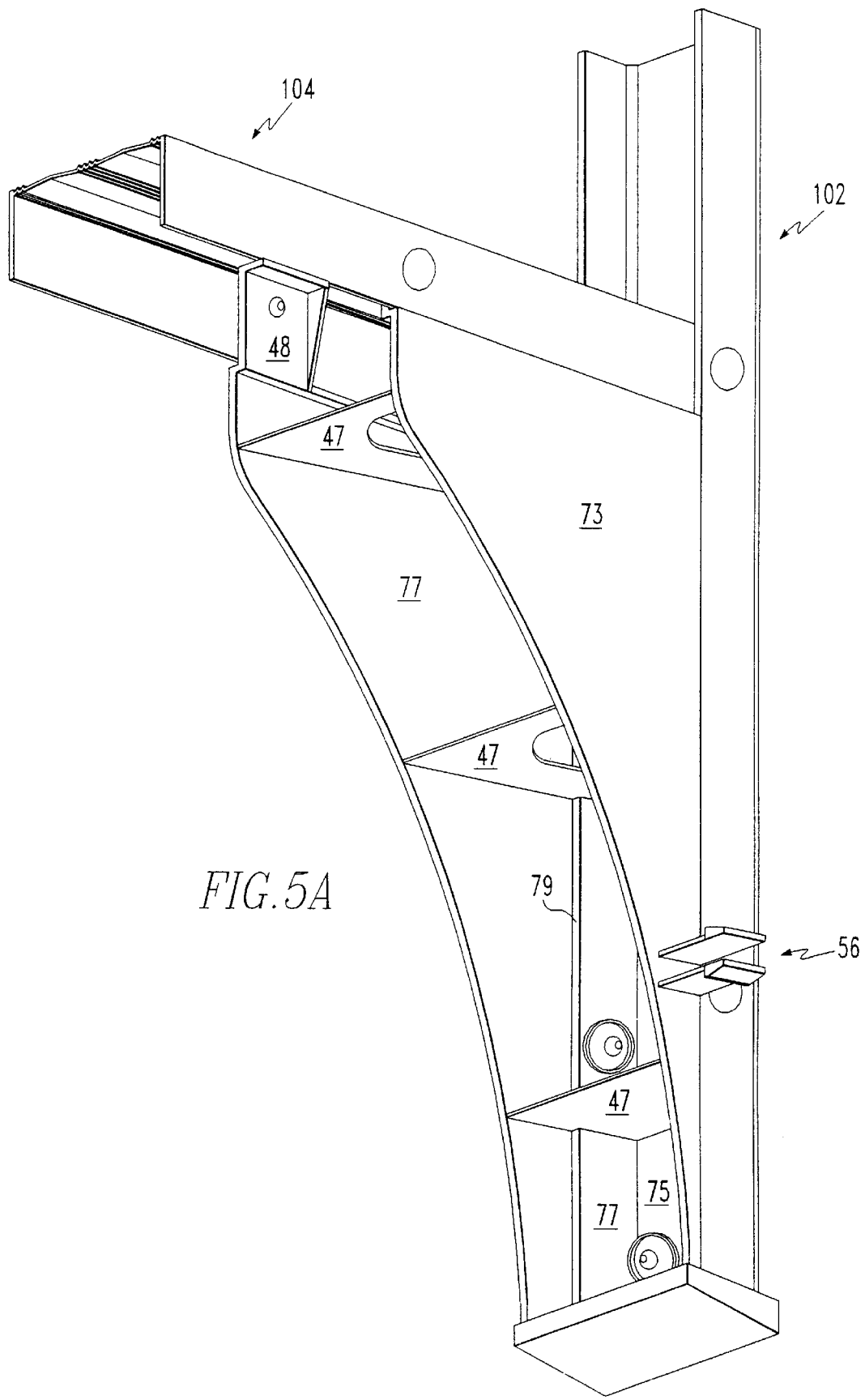
FIG. 5a is a schematic representation of an embodiment of a front member of the present invention connected to a horizontal member and a side rail.
Figure 5B:
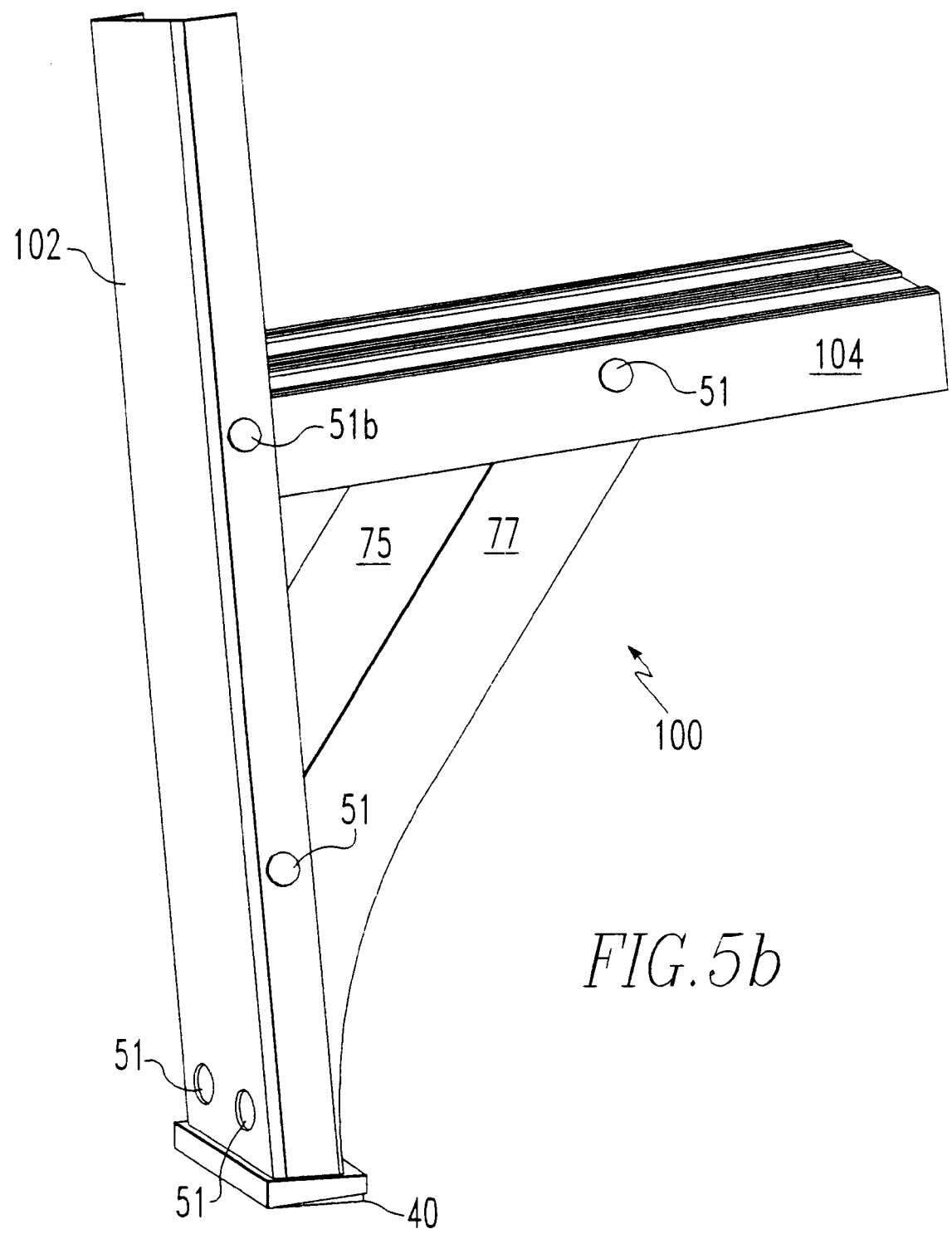
FIGS. 5b and 5c are schematic representations of a front projected view and an underside projected view, respectively, of another embodiment of a member connected to a horizontal member and a side rail.
Figure 5C:
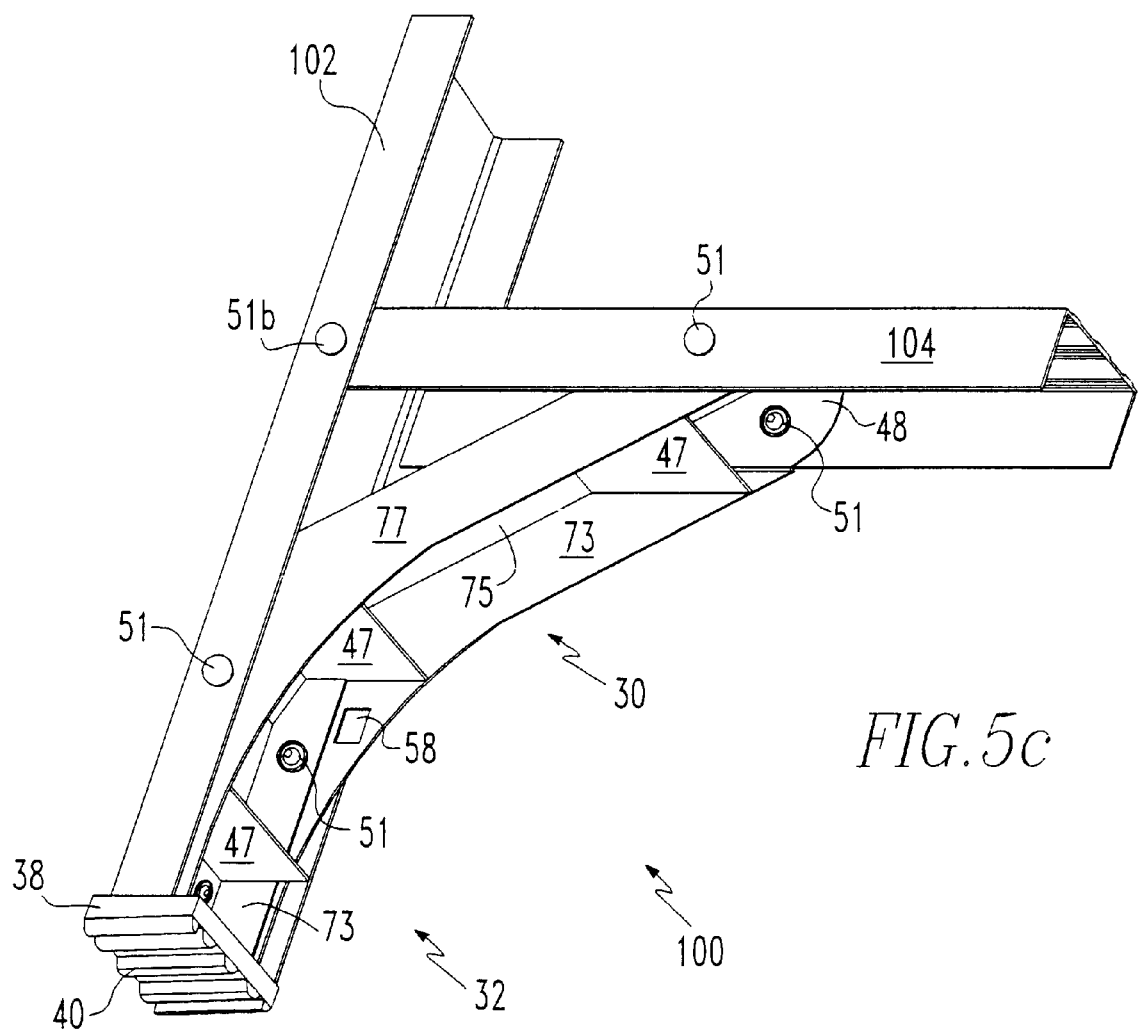
Figure 5D:
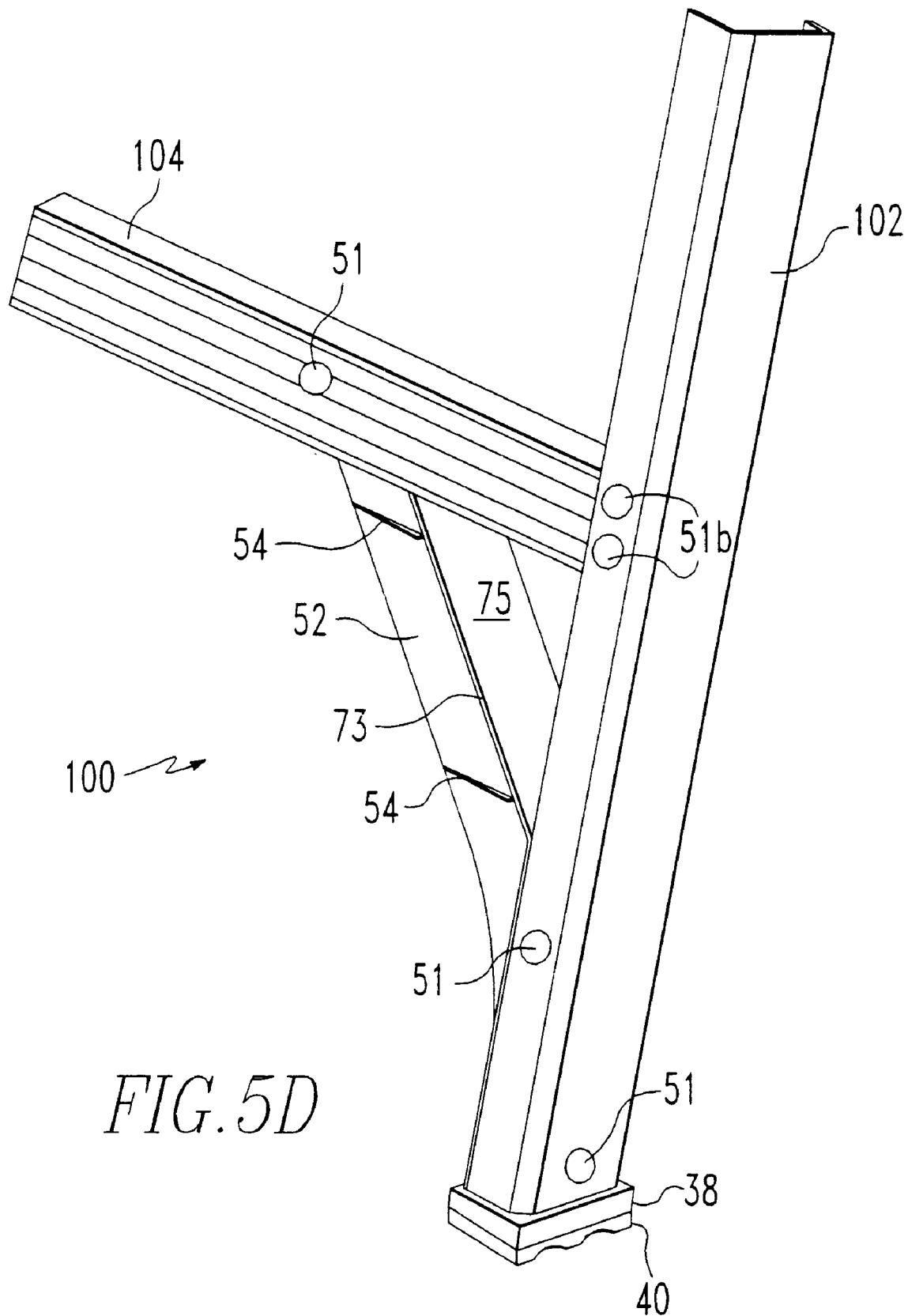
Figure 5F:
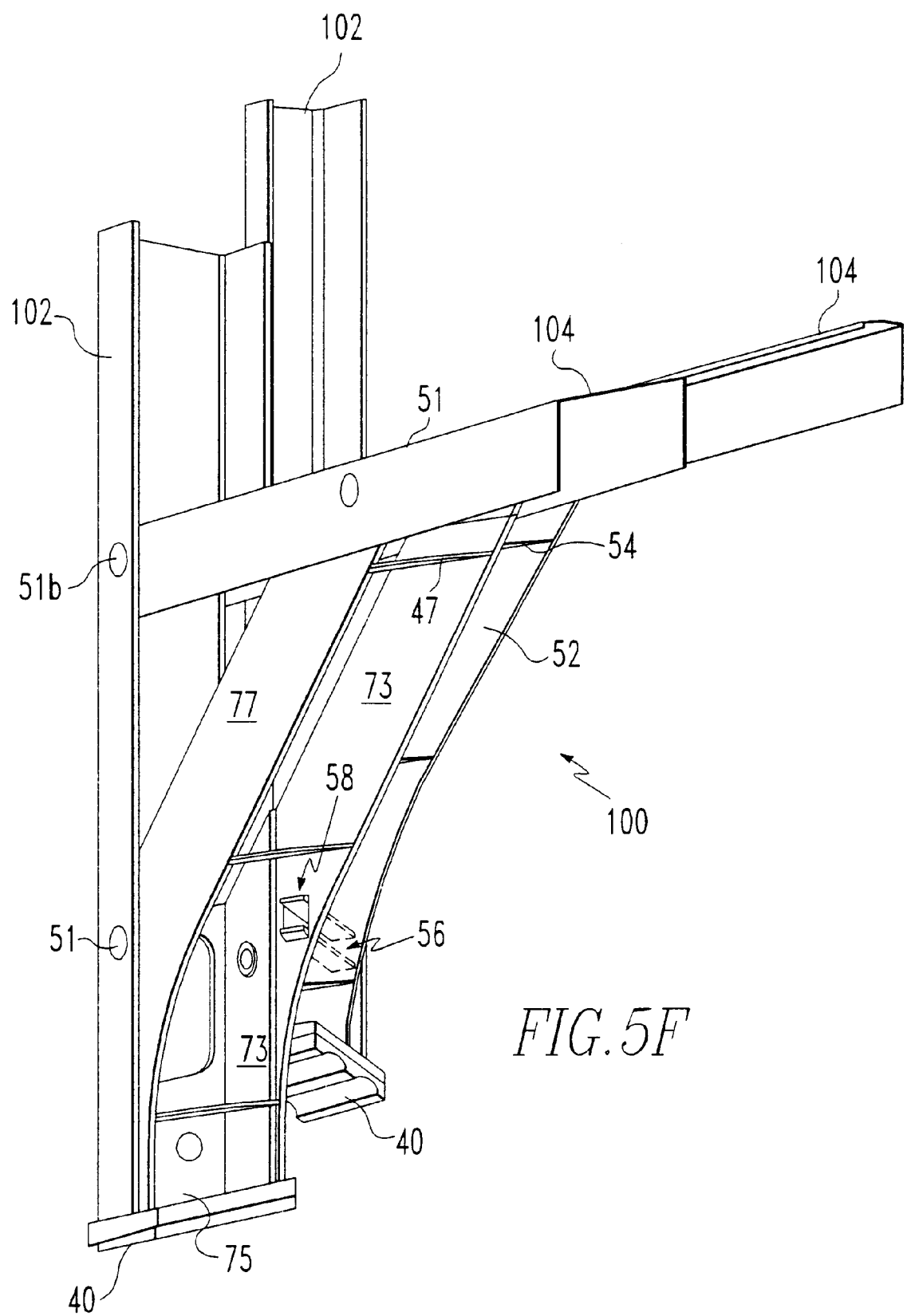
FIGS. 5f, 5g and 5h are underside projected views, side views and close-up side views, respectively, of the embodiment of the member shown in FIGS. 5b and 5c attached with the embodiment of the member shown in FIGS. 5d and 5e.
Figure 5G:
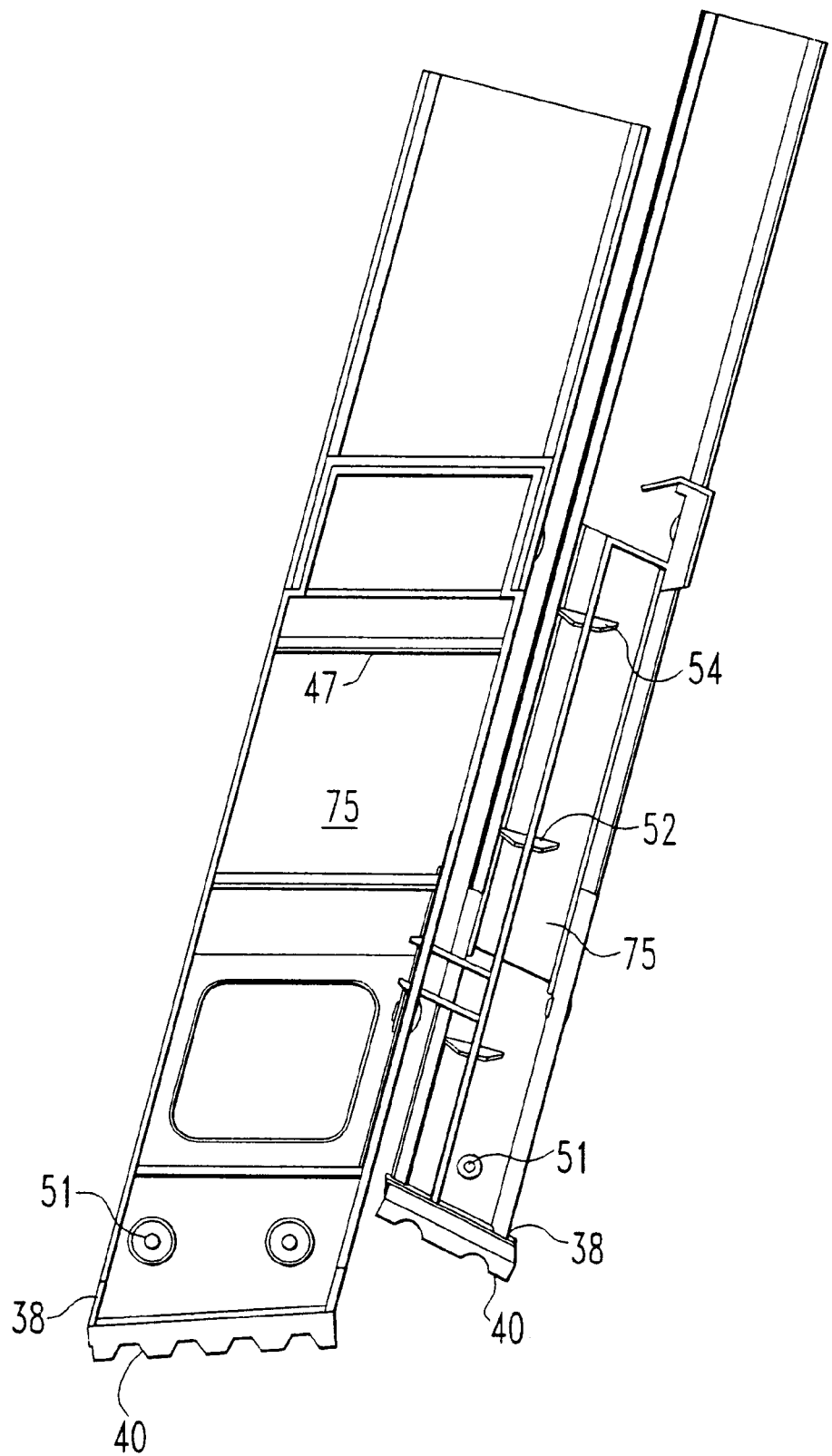
Figure 5H:
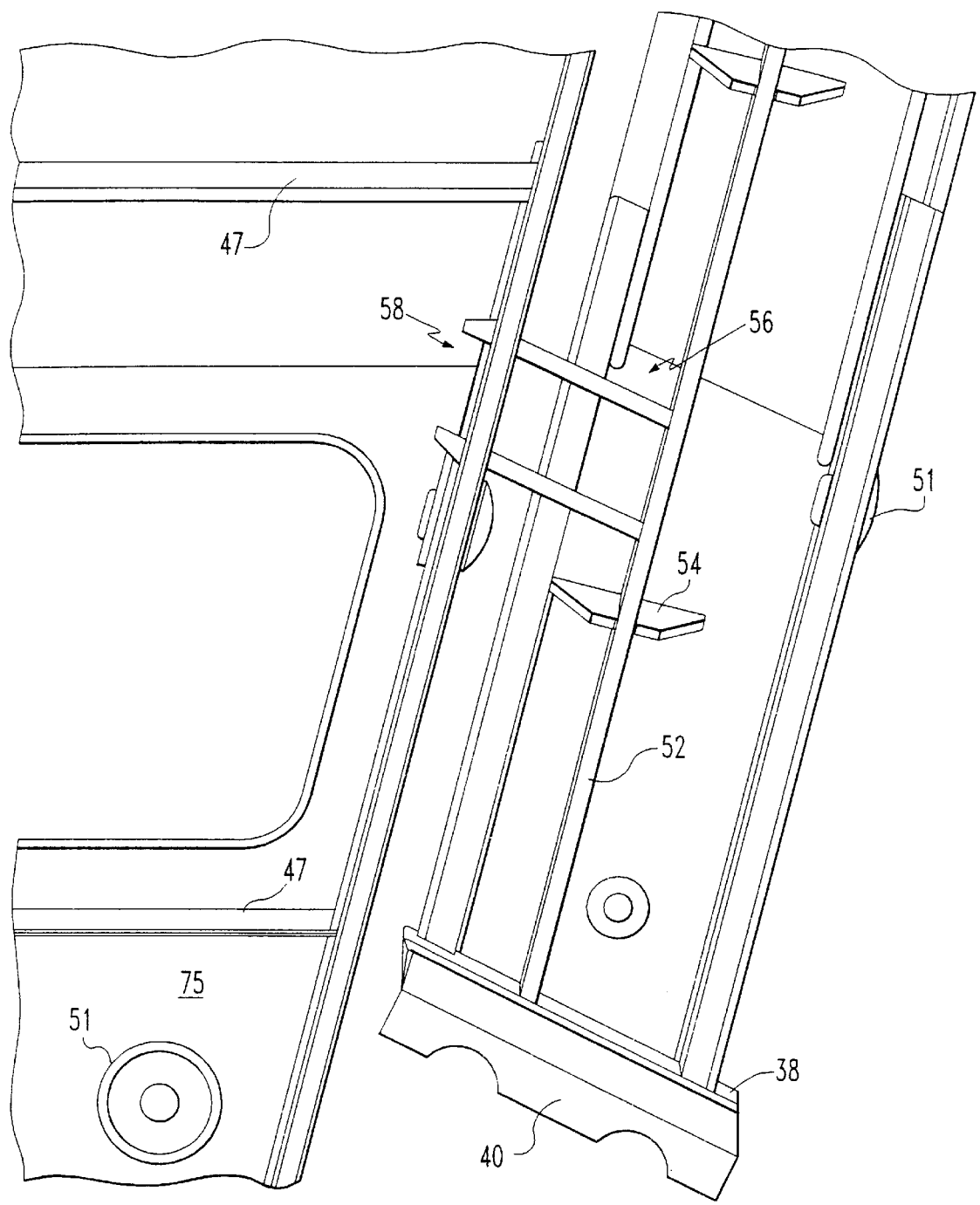

In yet another embodiment, the member has means or a mechanism for connecting the members together. As shown in FIG. 5, the member 100 has the means or mechanism for connecting the members together which includes a clip 56 attached to the first portion 30 or second portion 32 which extends therefrom to connect with a clip receiver 58 of an opposing member in a stepladder. The clip 56 in the clip receiver 58 maintains the rails in fixed spatial relationship so they do not damage each other or their joint connection to a ladder top by shifting relative to each other during transport or overextending the joint, respectively, during transport. Alternatively, the clip 56 can extend from a rib 52 of a member 100 to be used on a rear section 74 of a ladder 10, as shown in FIGS. 5d and 5e. The clip receiver 58 is then disposed in the first wall 73 of a member 100 to be used on a front section 64 of a ladder 100, as shown in FIGS. 5b and 5c. The clip 56 in connection with the clip receiver 58 is shown in FIGS. 5f–5h. The clip 56 and clip receiver 58 can also be tabs, velcro, etc., which maintain the rear rail with the associated front rail in fixed spatial relationship.

Figure 6A:
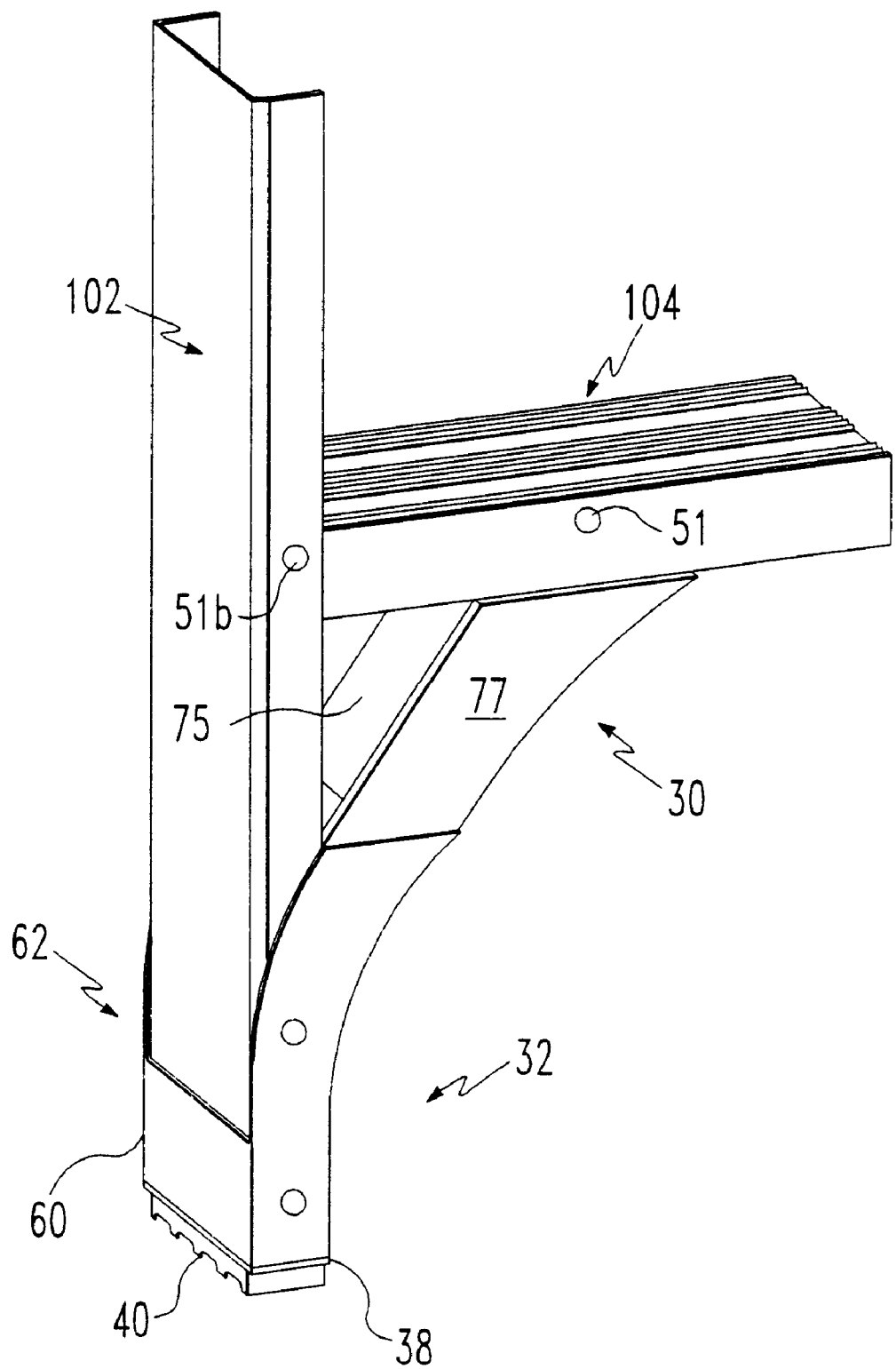
FIGS. 6a, 6b and 6c are schematic representations of a front projected view, an underside projected view and an overhead view, respectively, of yet another embodiment of a member of the present invention connected to a side rail and a horizontal member.
Figure 6B:
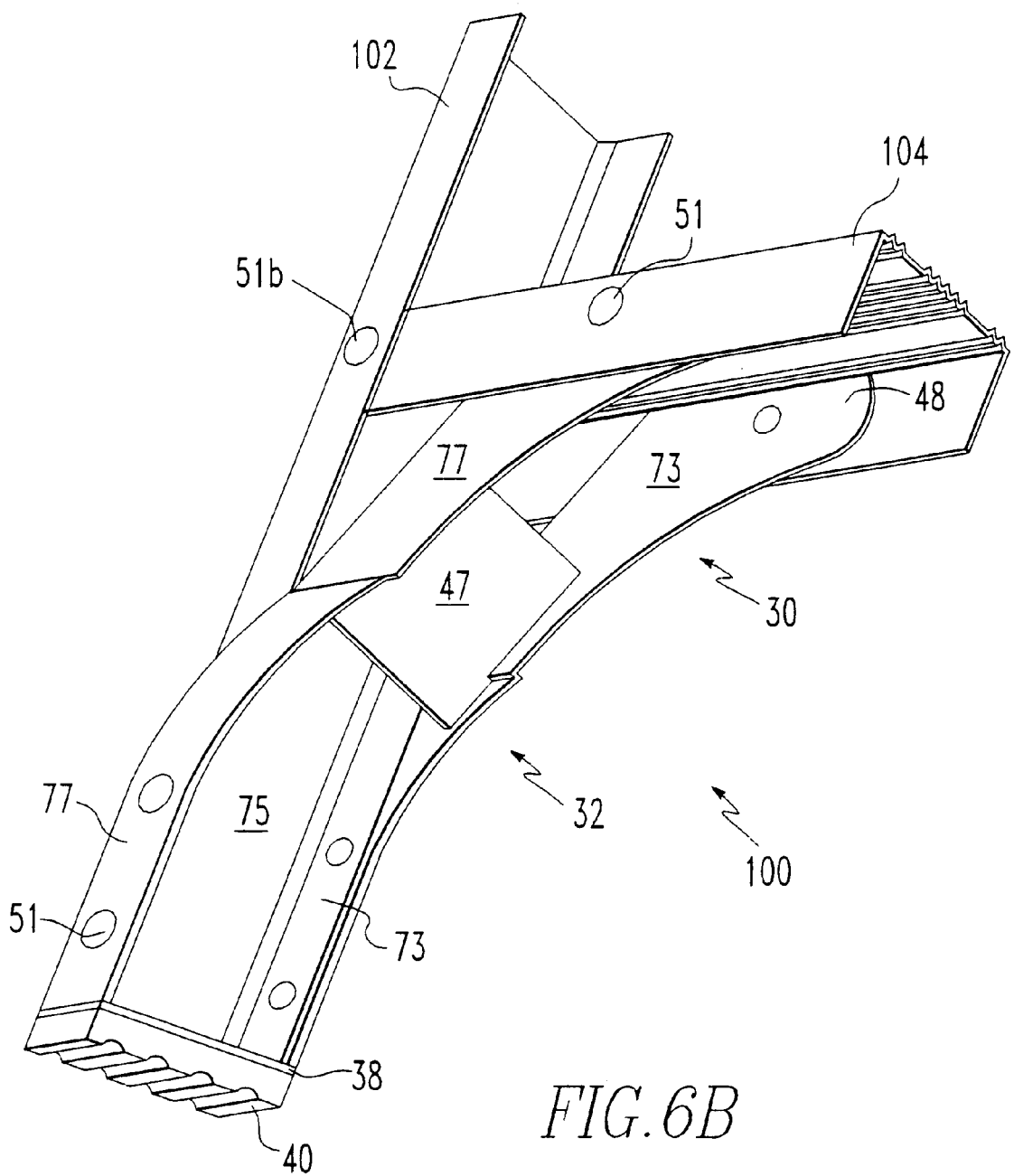
Figure 6C:
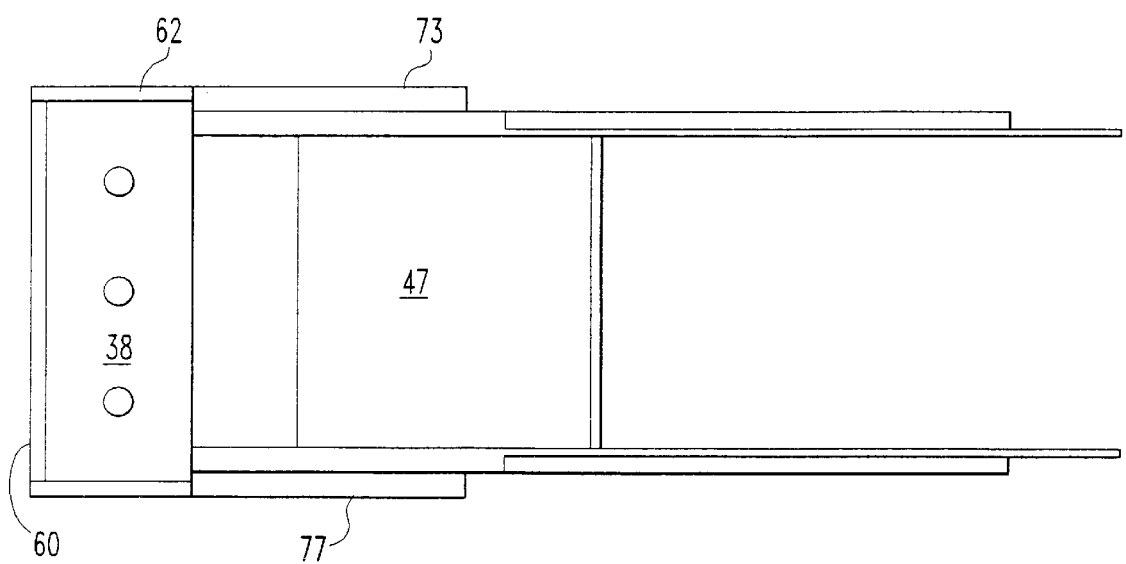

In still another embodiment as shown in FIGS. 6a and 6b, the second portion 32 includes a guard section 60 that is positioned about the rail 102 to which the second portion 32 is attached to protect the same. Preferably, the guard section 60 extends from the contact surface 44 and defines a pocket 62 therewith to receive the bottom 18 of the rail 102. FIG. 6c shows an overhead view of this embodiment of the member 100.

Figure 7:
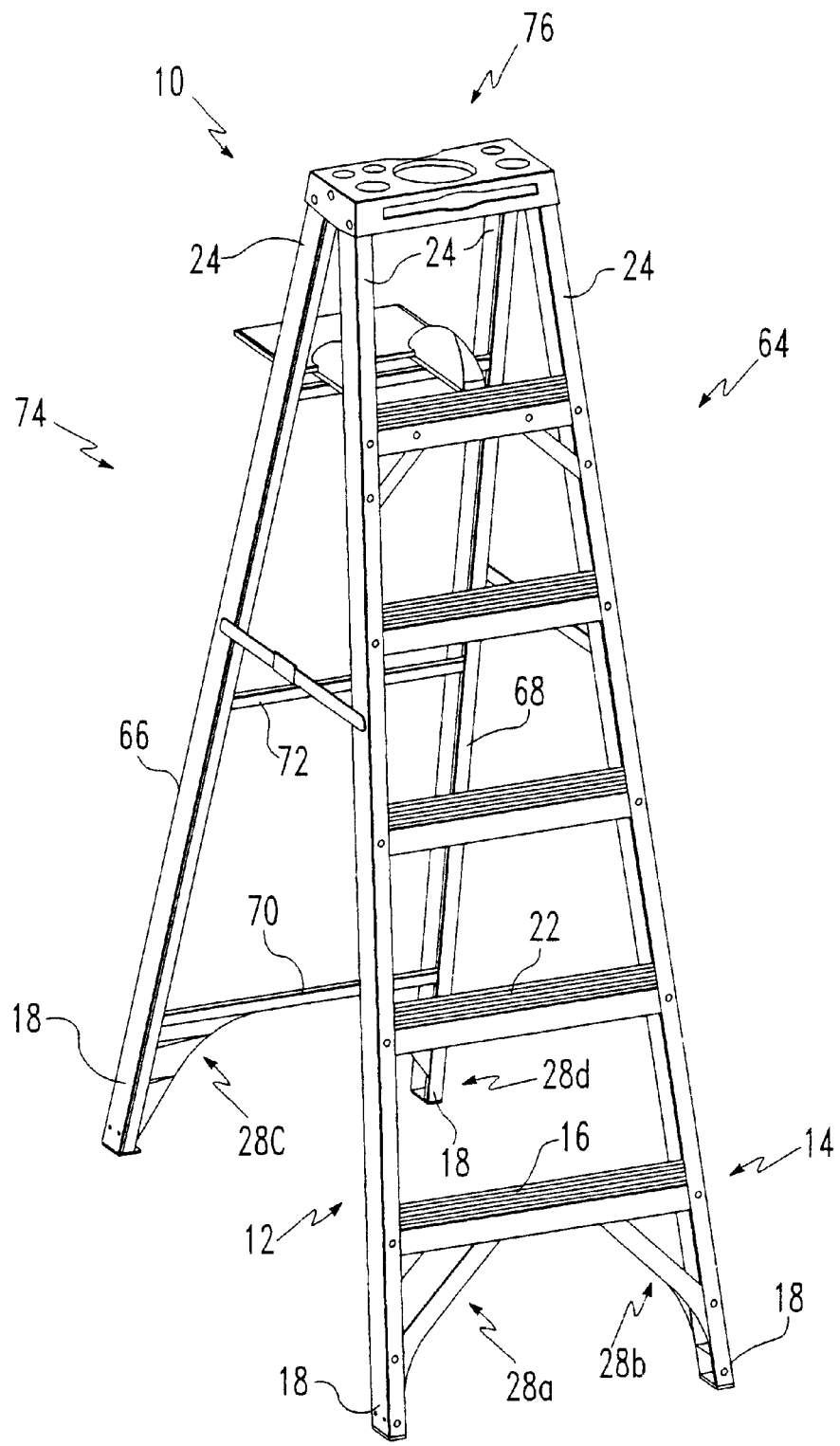
FIG. 7 is a schematic representation of a projected view of a ladder having front members and rear members of the present invention.
Figure 8A:
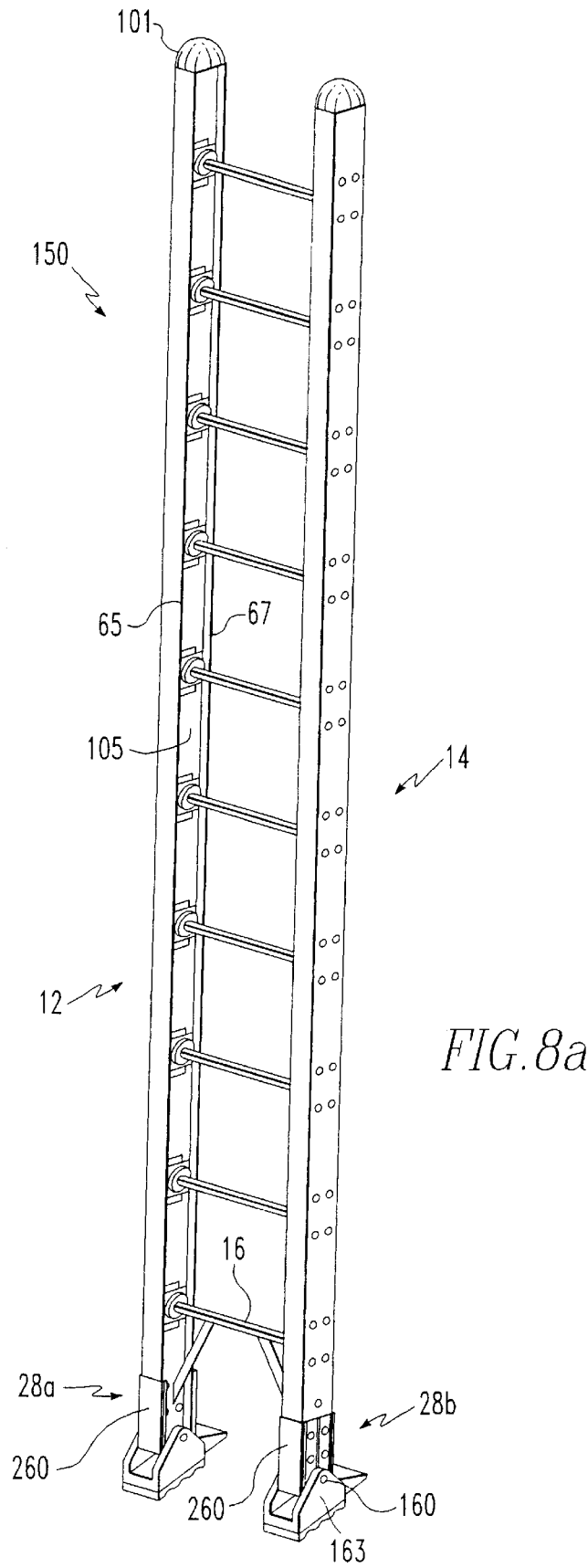
FIGS. 8a and 8b are schematic representations of a straight ladder and an extension ladder, respectively.
Figure 8B:
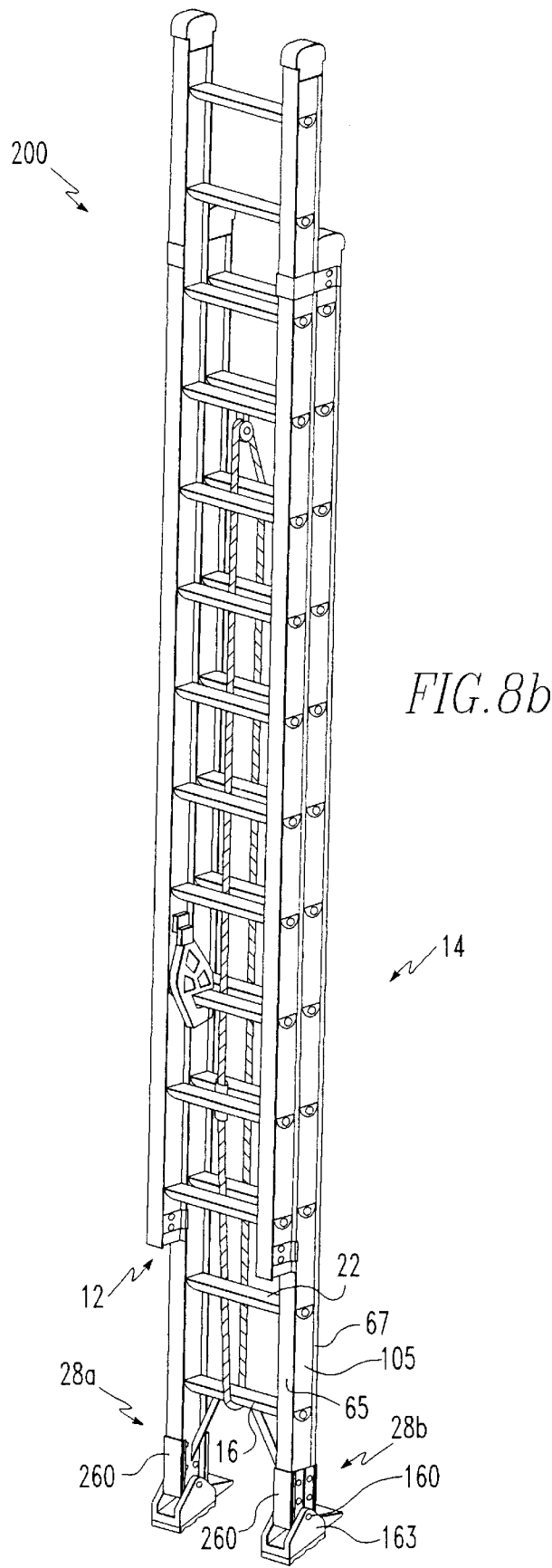

The present invention also pertains to a ladder 10, such as a straight ladder 150 or an extension ladder 200, as shown in FIGS. 8a and 8b, respectively, which is representative of a nonsupporting ladder or a stepladder, as shown in FIG. 7. The ladder 10 can be made of wood, plastic, fiberglass, aluminum or any material commonly used in the industry, or combinations thereof. The ladder 10 comprises a first side rail 12. The ladder 10 also comprises a second side rail 14 essentially in parallel with and adjacent to the first side rail 12. The ladder 10 also comprises a first step 16 connected to the first side rail 12 in proximity to the bottom 18 of the first side rail and connected to the second side rail 14 in proximity to the bottom 18 of the second side rail and essentially perpendicular with the first side rail 12 and second side rail 14. Additionally, the ladder 10 preferably comprises at least a second step 22 or a top cap 101 connected to the first side rail 12 and second side rail 14 at a location closer to the top 24 of the first side rail 12 and the top 24 of the second side rail 14 than the first step's 16 location relative to the respective top. There is a first front member 28a which is connected to the first side rail 12 and to the first step 16. There is also a second front member 28b which is connected to the second side rail 14 and to the first step 16. Preferably, the first side rail 12, second side rail 14, first step 16, second step 22, first member 28a, second member 28b define a front section 64. The first member 28a and second member 28b preferably are of a configuration as described above and shown in FIGS. 2–2f.

The ladder 10 preferably also includes a third side rail 66. There can also be a fourth side rail 68 essentially in parallel with and adjacent to the third side rail 66. The ladder 10 also can include a first horizontal 70 connected to the third side rail 66 in proximity to its bottom 18 and connected to the fourth side rail 68 in proximity to its bottom 18. There can be at least a second horizontal 72 connected to the third and fourth side rails at a location closer to the top 24 of the third side rail 66 and the top 24 of the fourth side rail 68 then the first horizontal's 70 location relative to the respective tops.

Additionally, the ladder 10 can comprise a first rear member 28c connected to the third rail 66 and to the first horizontal 70. Moreover, the ladder 10 can comprise a second rear member 28d connected to the fourth side rail 68 and to the first horizontal 70. The third rail 66, fourth rail 68, first horizontal 70, second horizontal 72, first rear member 28c and second rear member 28d define a rear section 74. The first member 28c and second member 28d preferably are of a configuration as described above and shown in FIGS. 3–3h.

Furthermore, the ladder 10 can comprise a ladder top 76 to which the top 24 of the first rail 12, the top 24 of the second rail 14, the top 24 of the third rail 66 and the top 24 of the fourth rail 68 are connected, as is well known in the art. Preferably, the ladder top 76, front section 64 and rear section 74 form a stepladder.

In the operation of the preferred embodiment, a ladder 10, as shown in FIG. 7, has a front section 64 comprised of a first side rail 12, a second side rail 14, at least a first step 16, a first front member 28a and a second front member 28b connecting the first step 16 to the first side rail 12 and second side rail 14, respectively. The first front member 28a and second front member 28b each have a first portion 30 and a second portion 32. The first portion 30 is connected to the first step 16 of the ladder 10 at a flange portion 48 at a first end 49 of the first portion 30. The second portion 32 of the first front member 28a is connected to the first side rail 12, and the second portion 32 of the second front member 28b is connected to the side rail 14 of the ladder 10. The second portion 32 is also integrally connected to the first portion 30 at the first end 34 of the second portion 32 and to a foot 38 at a second end 36 of the second portion 32.

The second portion 32 has a channel 81 with a contact surface 44 defined by its first arm 73, central body 75 to which the first arm is integrally connected, second arm 77 to which the central body 75 is integrally connected at the end 76 opposite the end 78 the first arm 73 is connected to the central body 75 and the second portion flanges 79, as shown in FIG. 2b. In the channel 81, the respective rail fits with and conforms with the contact surface 44 which extends from the first end 34 of the second portion to the foot 38 that is integrally connected to the second portion 32 at the second portion's second end 36. The respective rail rests against the foot 38 during normal operation. On the foot bottom 42 is a foot pad 40 for gripping the ground when the ladder is in use. The first portion 30 and second portion 32 of each front member 28a, 28b is comprised of cross plates 47 disposed at predetermined positions. The cross plates 47 connect to the first arm 73, central body 75 and second arm 77, as shown in FIG. 2d. These cross plates 47 provide support to the first arm 73, central body 75 and second arm 77 so they do not collapse or fold in when loads they are rated for are placed on them. The cross plates 47 are essentially in place of a solid rectangular shaped cross section with a reduction in weight relative to the weight associated with a solid rectangular shaped cross section.

By the first front member 28a and second front member 28b being comprised of one continuous piece of plastic, it saves time in assembly since only one piece has to be connected to the respective rail and step 16. The presence of the second portion 32 having the contact surface 44 extending from its first end 34 to the foot 38 also provides additional support in regard to forces on the ladder 10 than would otherwise be present if a traditional knee brace only was present connecting the respective rail to the step 16. Forces which are transmitted to the first portion 30 from the rail are in turn transmitted to the second portion and consequently distributed throughout the contact surface 44. Since the contact surface 44 is in contact with the rail, the force being transmitted through the contact surface 44 causes the contact surface 44 to push against the rail. The force is thus transmitted to the rail over essentially the entire contact surface 44 which effectively dissipates the force because it is no longer concentrated at any one localized area. This can be seen, for instance, when a cantilever force is applied to the second portion 32. The force is distributed through the contact surface 44, causing the first arm 73, contact body 75 and second arm 77 to transmit the forces along their length to the rail rather than being focused essentially at the point where the rivet 51 contacts the respective rail. For instance, a horizontal force arising from a user placing his foot in a somewhat horizontal direction relative to the ground onto the corner of the step 16 has the force thereon transferred to the step 16 on which the foot is placed. In turn, this force is transmitted to the rail 12 through the rivet 51b, as shown in FIG. 1, that connects the step 16 to the rail 12. Additionally, force on the step 16 is transferred by the first portion 30 connected with the step 16 to the second portion 32 which is connected also to the rail 12 through rivets 51 and along the contact surface 44. This force is applied to the rail 12 through the first arm 73 and central body 75 which push against the rail 12. Since this force is in the form of a twisting force, the second arm 77 also pushes against the inside portion of the rail 12 to which it contacts. This is because the second arm 77 also experiences the twisting force which tends to attempt to drive it out and away from the rail. However, due to the fact that it conforms with the rail, it instead transfers the force to the rail, rather than twisting out of the rail. In short, due to the length of the second portion 32, a force is dissipated by being distributed over a larger surface area than if there was only a rivet 51 connecting the first portion 30 from the step 16 to the rail 12.

Similarly, a cantilever force applied to the bottom 18 of the first side rail is distributed to the contact surface 44, through the first portion 30 to the step 16. The presence of the second portion 32 extending along the rail through its contact surface 44 thus dissipates the force that would otherwise be mostly absorbed by the rail or concentrated at a rivet 51 if there was no second portion 32 present. Essentially, this same explanation of dissipation of forces is present whether the force arises from a user placing his foot on the first step 16 or a second step 22 that is higher off of the ground, whether the force arises from a user shifting his weight while standing off-center on a step or an external cantilever force is applied to the rail during transportation, such as when it is put in or taken out of a truck, or dropped.

In regard to the first rear member 28c and second rear member 28d, they are connected to the third rail 66 and fourth rail 68, respectively, and to the first horizontal 70 of the rear section 74 of the stepladder 10. Each rear member has a contact surface 44 and a channel 81 as described above in regard to the front members. The important difference, however, is that the first arm 73 of the rear member is shorter than the second arm 77 of the rear member due to the fact that the side rails of the rear section 74 are of essentially this same cross sectional configuration and require the same configuration of the rear members 28c, 28d so they can conform with and contact the rear side rails.

There is a rib 52 which extends from the central body 75 offset from the central body's center 86 which is closer to the first arm 73 than to the second arm 77, as shown in FIG. 3h. The rib 52 extends from the foot 38 to the flange 48 of the first portion 30. The first portion 30 has a first arm 73 connected to a central body 75, and a second arm 77 also connected to the central body 75 at its end 76 opposite the end 78 the first arm 73 is connected to the central body 75, as shown in FIGS. 3a and 3g. The first arm 73 and the second arm 77 in the first portion 30 extends only a small distance relative to the first arm 73 of the second portion 32 to minimize weight in regard to the loads it is required to withstand. The first portion extends at an angle of 42° from the second portion 32. The rib 52 has struts 54 at predetermined locations that support the rib 52 against bending. The rib 52 supports the central body 75 from bending. The first portion 30 of each rear member is connected to the first horizontal 70 through its flange 48 that extends from the first arm 73.

When a cantilever force is applied to the bottom 18 of a rail on the rear section 74, the force is distributed from the rail to the contact surface 44 of the second portion 32. The first arm 73, the central body 75 and the second arm 77 which define the contact surface 44 of the second portion 32 transfers forces either from the rail or to the rail in which they are in contact depending on the direction from where the force arises. Such force is dissipated by it being spread out over the contact surface 44 as opposed to it being localized at a rivet of a normal shaped knee brace that extends essentially only from the rivet on a rail to a horizontal. The forces transmitted to the contact surface 44 from the rail are in turn transferred to the rib 52 and the central body 75, the first arm 73 and the second arm 77 of the first portion 30. The flange 48 connected to the first arm 73 and central body 75 and rib 52 in turn transfers this force to the first horizontal 70. A twisting force transferred through the first portion does not cause the first portion 30 to fail because of the rib 52, which effectively expands the profile of the first portion to better resist twisting or bending forces, but again with minimum weight. The struts 54 serve to support the rib 52 to further strength it against bending or twisting forces. When forces are transmitted through the rear member from the first horizontal 70 to the respective rail, reaction of the rear member is the same except in reverse order. The presence of the second portion 32 allows the force from the horizontal 70 to be diffused along the rail from the contact surface 44 instead of just in the localized area about the rivet where the first horizontal 70 is attached to the respective rail or the rivet 83, as described above in regard to the front members with the rails on the front section 64.

Figure 9A:
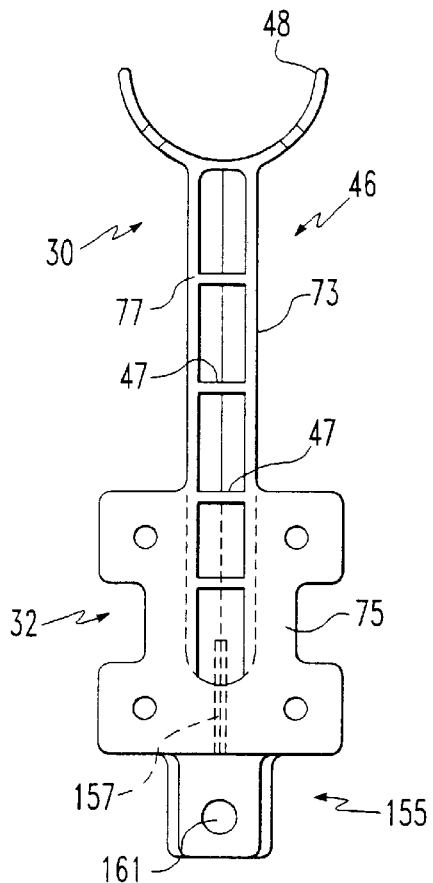
FIGS. 9a, 9b, 9c, 9d and 9e are schematic representations of another embodiment of a member of the present invention for nonsupporting ladders.
Figure 9B:
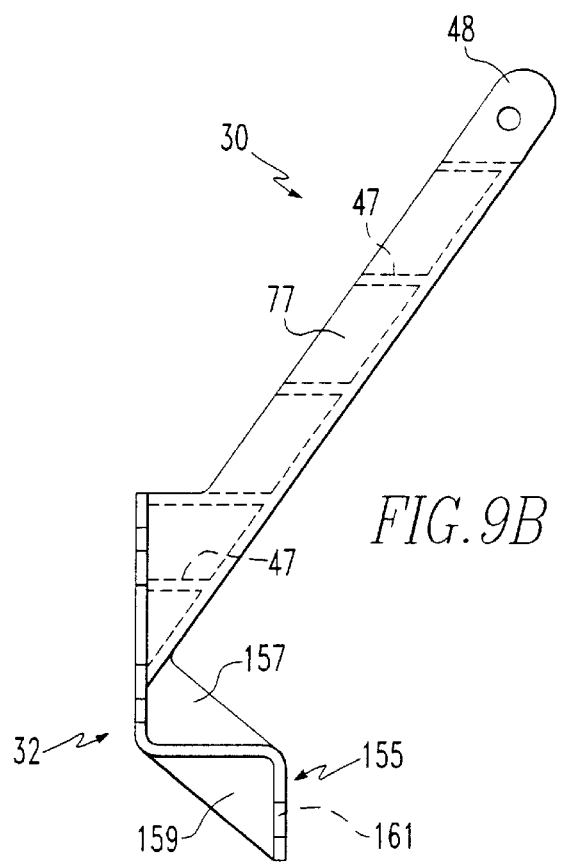
Figure 9C:
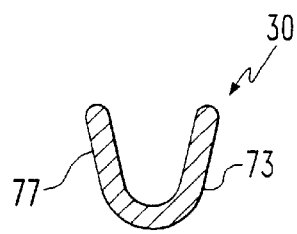

As shown in FIGS. 9a, 9b, 9c, 9d and 9e, another embodiment of a member 100 can be used on a nonsupporting ladder such as an extension ladder or straight ladder. In this embodiment, the member 100 has a first portion 30 which preferably has a V-shaped cross section, as shown in FIG. 9c. The first portion 30 has a first arm 73 and a second arm 77 integrally connected to and in angular relationship with the first arm 73. The first portion 30 preferably has buttressing 46. The buttressing 46 can comprise cross plates 47 to support the first arm 73 and second arm 77. The first portion 30 is also preferably comprised of a flange 48 through which the first portion 30 is attached to the horizontal element 104. For instance, a rivet can be used to connect the flange 48 to the horizontal element 104.

The first portion 30 is integrally connected to a second portion 32 at an angle of 20–60° and preferably 32°. The second portion 32 is comprised of a central body 75 to which the first arm 73 and second arm 77 are integrally connected and from which they extend. The central body 75 connects to the rail 102 of the nonsupporting ladder through, for instance, rivets. The second portion 32 also preferably has a shoe attachment portion 155 that is integrally connected to and extends from the central body 75. The first portion 30 preferably also has a top rib 157 which is integrally connected to and extends from the central body and the first portion 30 to the shoe attachment portion 155. There is a bottom rib 159 which is integrally connected to and extends from the central body 75 to the shoe attachment portion 155 on the opposing side the top rib 157 is connected to it. Preferably, the rib 159 is offset relative to the rib 157, as shown in FIG. 9a. The shoe attachment portion 155 has a hole 161 through which bolt 160 connects a ladder shoe 163 to the rail 102. Of course, the member 100 need not have the shoe attachment portion 155 and the ribs 157, 159.

Figure 9D:
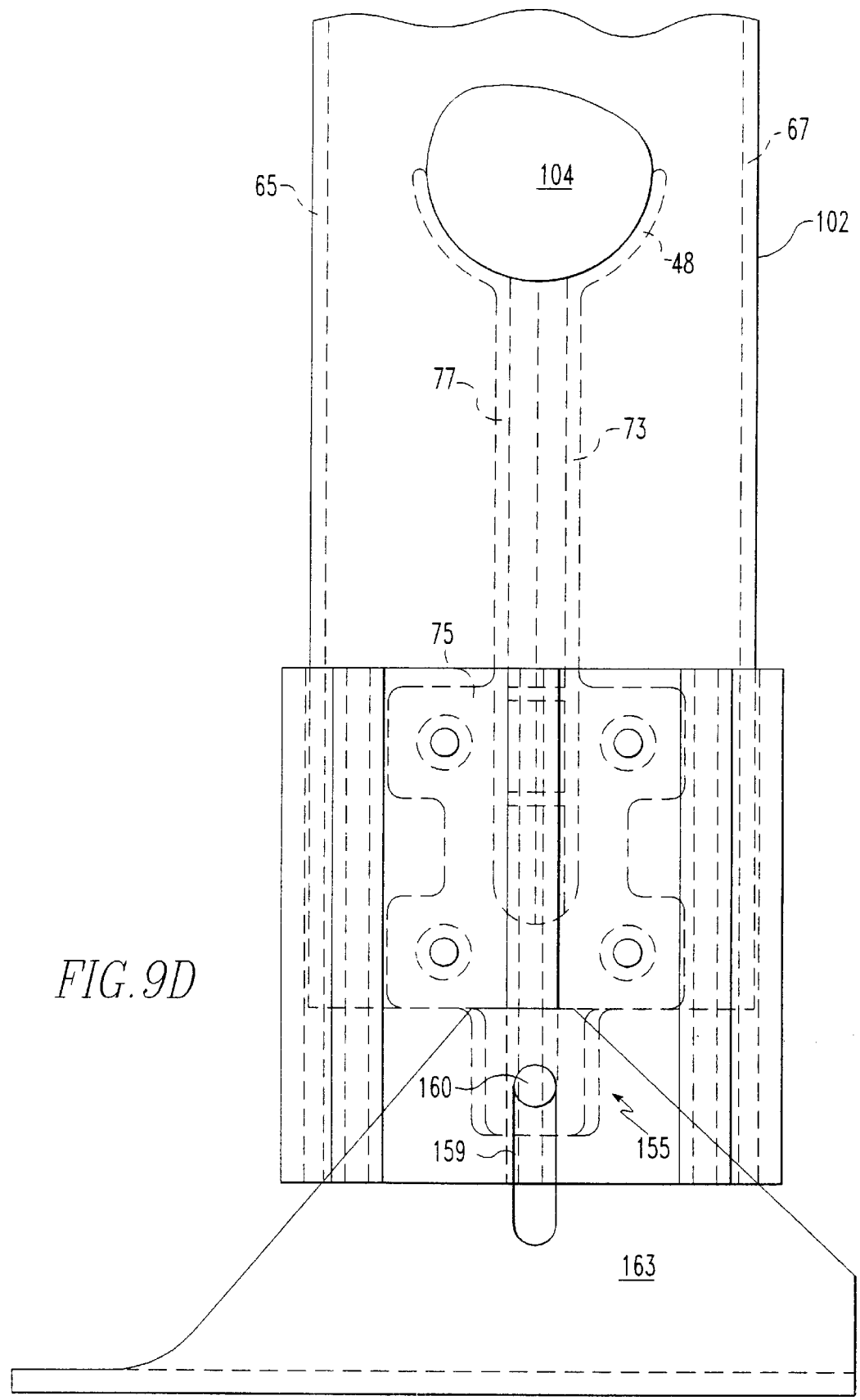
Figure 9E:
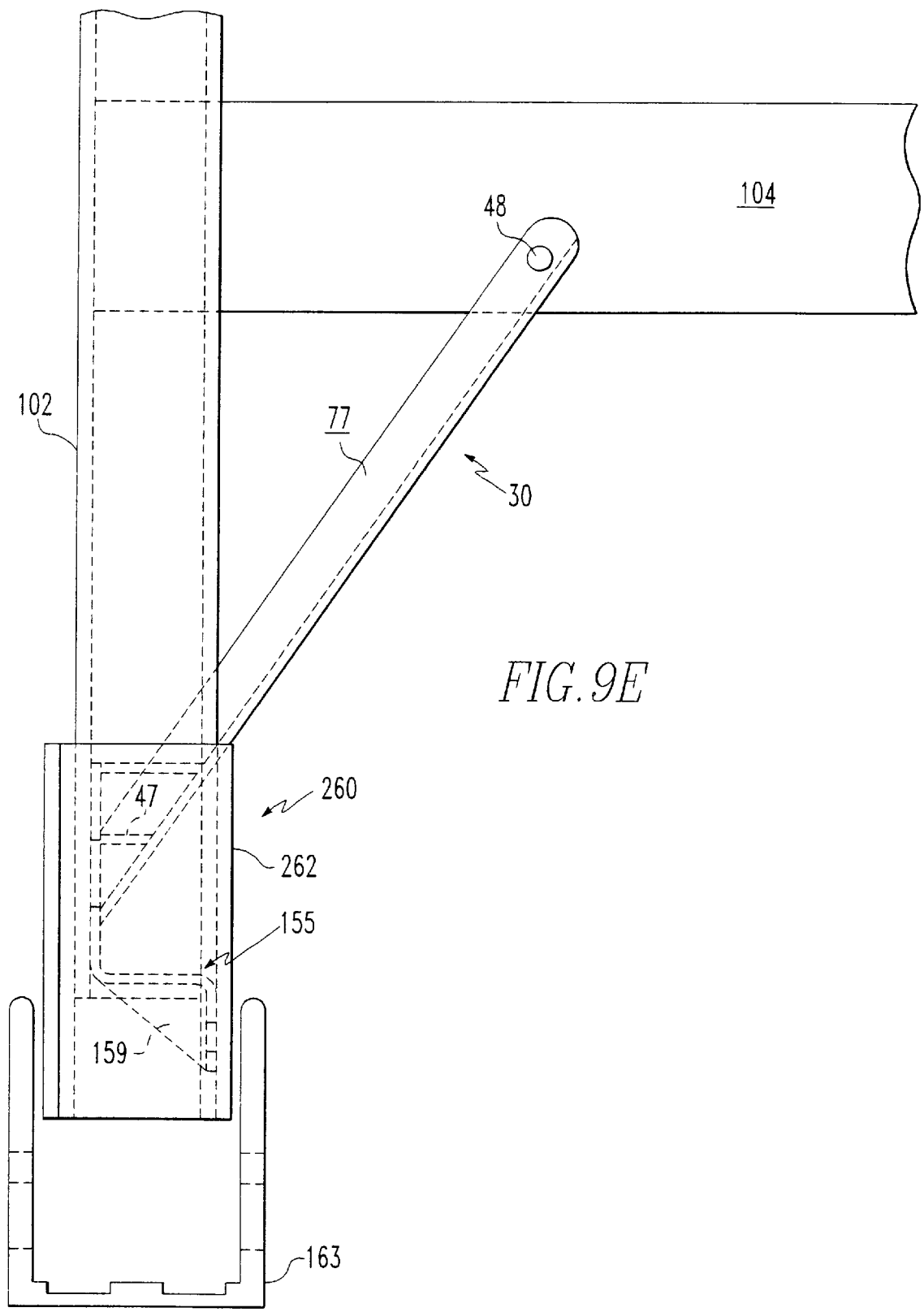

As shown in FIG. 8a, in regard to a straight ladder 150, and FIG. 8b in regard to an extension ladder 200, a first rail member 28e and a second rail member 28f are used to provide further support. The first rail member 28e and second rail member 28f are preferably of a configuration as described above and shown in FIGS. 9a–9e. The first rail member 28e and the second rail member 28f are connected to the first step 16 and first rail 12 and second rail 14, respectively. The straight ladder 150 and the extension ladder 200 have rail guards 260 that are attached to the bottom 18 of rails 12, 14 and positioned about the outside of the rails 12, 14. The rail guards 260 fit about and grab the first rail flange 65 and second rail flange 67, as shown in FIG. 9d. The shoe attachment portion 155 extends from the central body 75 attached to the central flange 105 of the rails to essentially the outside edge 262 of the rail guard 260 to be flush and even with it. The shoe 163 aligns with the shoe attachment portion 155 so a bolt 160 fits through the hole 161 of the shoe attachment portion 155 and a hole in the central flange 105 of the rail 12, 14 and is attached to the respective rail 12, 14 as is well known in the art. See, for instance, U.S. Pat. No. 5,154,255, incorporated by reference. It should be noted that all embodiments described herein of the member 100 are produced by standard injection molding gas techniques.

Figure 11A:
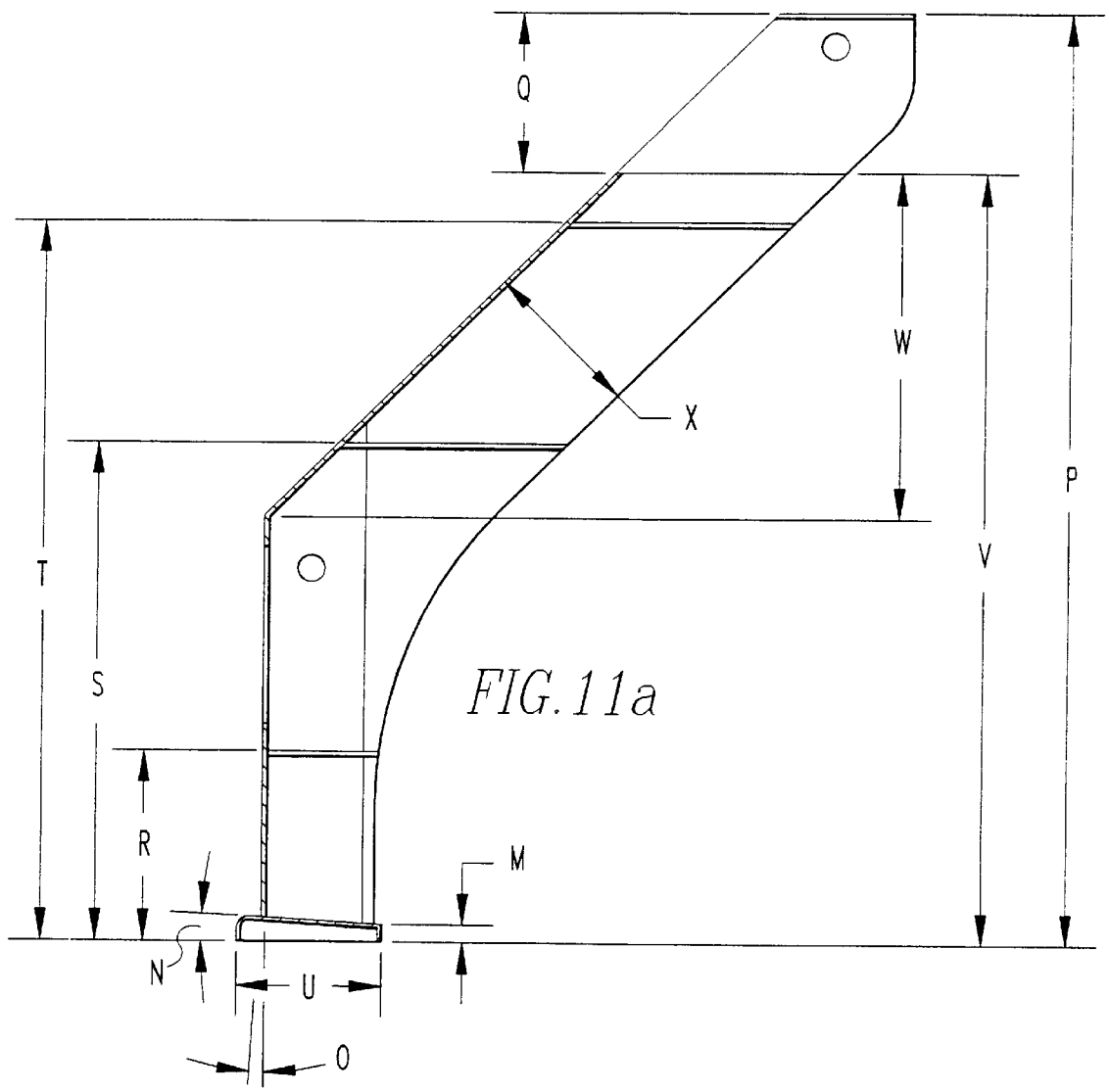
FIGS. 11*a* and 11*b* are schematic representations of a member of the present invention for a stepladder.
Figure 11B:
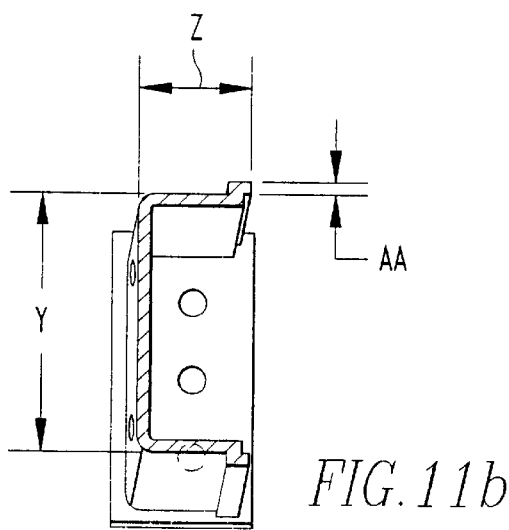
Figure 12A:
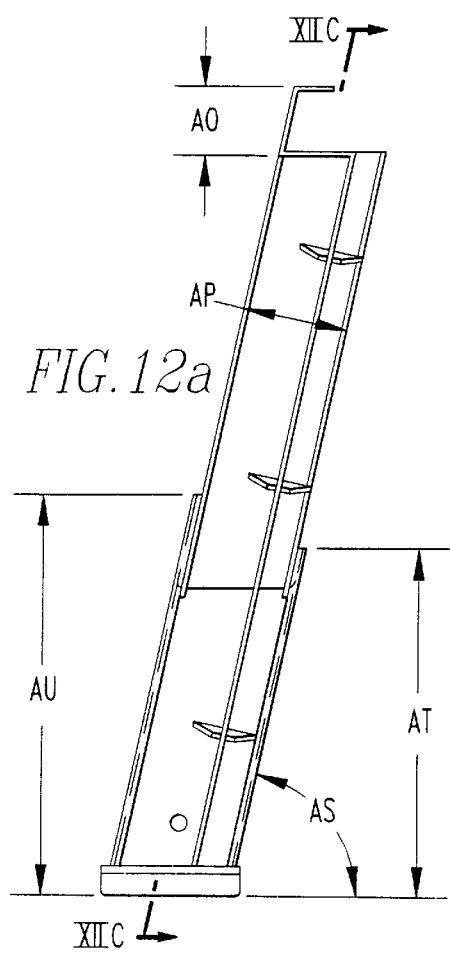
FIGS. 12*a*, 12*b*, 12*c* and 12*d* are schematic representations of a member of the present invention for a stepladder.
Figure 12B:
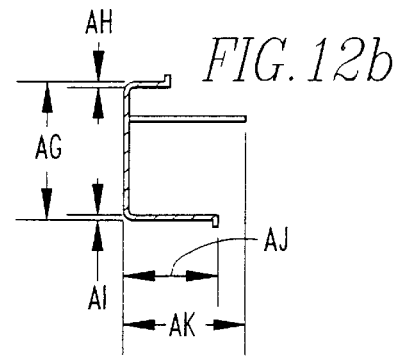
Figure 12C:
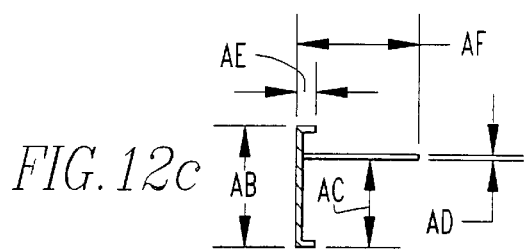
Figure 12D:
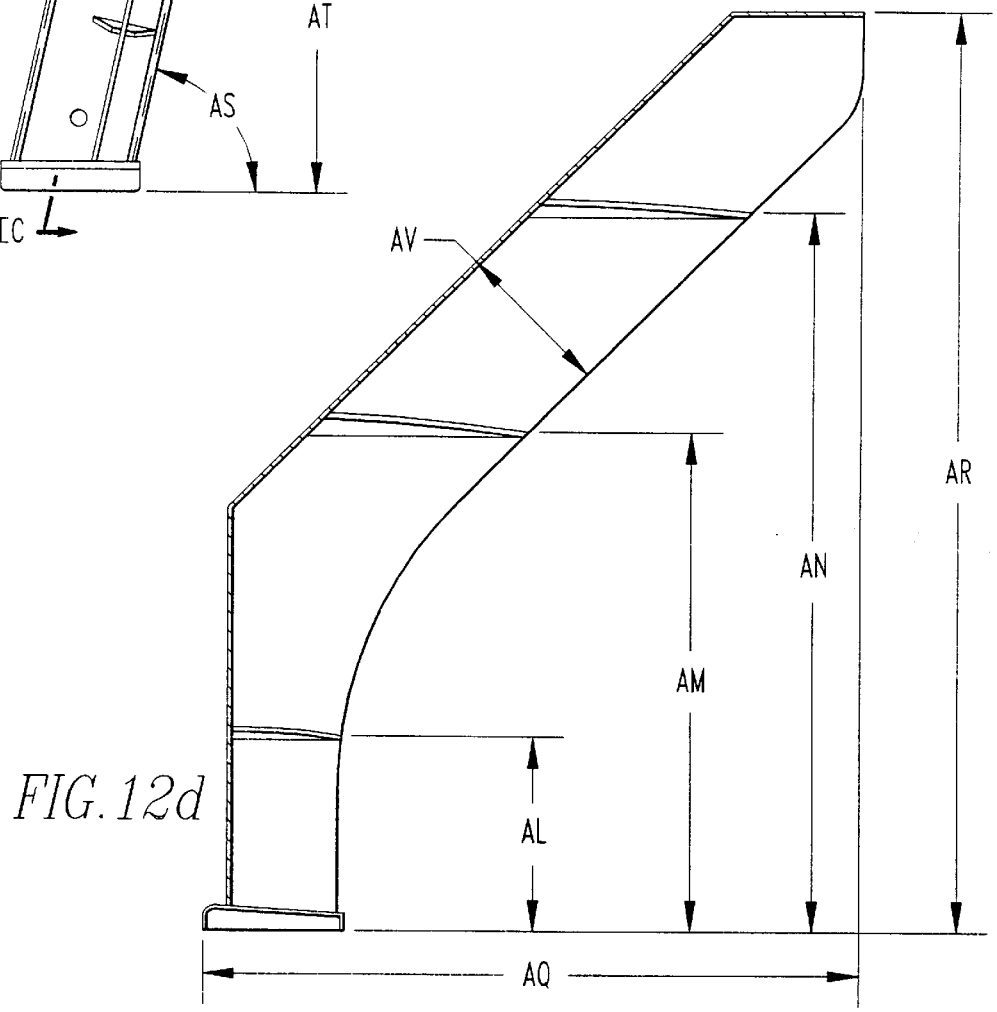

As representative of one embodiment of many possible embodiments whose dimensions and configurations are dictated by the application; the dimensions of a member for a nonsupporting ladder (FIGS. 10a, 10b and 10c), a member for a front section of a stepladder (FIGS. 11a and 11b), and a member for a rear section of a stepladder (FIGS. 12a, 12b, 12c and 12d) are given in the following table.

TABLE

| | |
|---|---|
| A | .625 inches |
| B | .625 |
| C | .969 |
| D | 2.188 |
| E | .95 |
| F | .813 |
| G | 2.313 |
| H | .66 |
| I | 7.067 |
| J | 1.212 |
| K | 2.313 |
| L | 32° |
| M | .250 |

TABLE-continued

| | |
|---|---|
| N | 3.567° |
| O | 3.567° |
| P | 10.972 |
| Q | 1.450 |
| R | 2.25 |
| S | 6.0 |
| T | 9.25 |
| U | 3.304 |
| V | 9.5 |
| W | 4.5 |
| X | 1.750 |
| Y | 2.910 |
| Z | 1.050 |
| AA | .120 |
| AB | 1.322 |
| AC | .852 |
| AD | .9 |
| AE | .188 |
| AF | 1.750 |
| AG | 1.70 |
| AH | .186 |
| AI | .191 |
| AJ | 1.117 |
| AK | 1.681 |
| AL | 2.311 |
| AM | 5.134 |
| AN | 7.888 |
| AO | .869 |
| AP | 1.322 |
| AQ | 8.019 |
| AR | 9.779 |
| AS | 77° |
| AT | 4.227 |
| AU | 4.489 |
| AV | 1.750 |

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A ladder comprising:

a first side rail having a first rail flange and a second rail flange and a web which together form a u-shaped cross-section;

a second side rail essentially in parallel with and adjacent to the first side rail, said second side rail having a first rail flange and a second rail flange and a web which together form a u-shaped cross-section;

a horizontal element connected at a first joint to the first side rail in proximity to its bottom and connected at a second joint to the second side rail in proximity to its bottom and essentially perpendicular with the first and second side rails;

a first front member connected to the first side rail and the horizontal element; and a second front member connected to the second side rail and to the horizontal element, each front member having first and second flanges joined by a web which together form a u-shaped cross-section and comprising:

a first portion that connects to the horizontal element; and a second portion which connects to a respective rail and terminates at a distance from the respective joint, the second portion's first and second flanges and web presenting three contact surfaces which connect to the rail and extend essentially in parallel with the respective rail of the ladder and conforms with the rail to which it is attached so forces can be transferred therebetween, said second portion integrally connected to the first portion such that the first portion and second portion are one continuous piece, wherein said first and second flanges the first rail flange and second rail flange, respectively, and the web of the front member contacts the web of the rail of u-shaped cross-section.

2. A ladder as described in claim 1 wherein the horizontal element has a u-shaped cross-section, the end of the first portion of the members are formed such that three faces thereof come into contact with the three inner faces of the horizontal element and the second portion of the members are fixedly connected to the flanges of the rail.

3. A ladder is described in claim 1 wherein the first portion, second portion and foot are one continuous piece of plastic.

4. A ladder as described in claim 3 wherein the first portion forms an angle of 30–60° with the second portion.

5. A ladder as described in claim 4 including a foot pad to contact ground when the rail to which it is attached is in operable position, said pad attached to the bottom of the foot.

6. A ladder as described in claim 5 wherein the foot is angled to be disposed flat relative to the ground when the rail to which it is attached is in operable position.

7. A member as described in claim 6 wherein the second portion includes a cross plate which extends essentially perpendicular with the respective rail of the ladder, said cross plate one continuous piece with said second portion.

8. A ladder as described in claim 6 wherein the first portion and second portion include buttressing.

9. A ladder as described in claim 2 the second portion has a first end connected to the first portion and a second end including a foot integrally connected to the second end of the second portion to form one continuous piece therewith, said foot disposed to receive the bottom of the rail so weight on the rail is transferred to the foot or the second portion.

10. A ladder as described in claim 8 wherein the buttressing includes cross plates disposed in predetermined locations in the u-shape of the first and second portions, said cross plates forming one continuous piece with the first and second portions.

11. A ladder as described in claim 8 wherein the buttressing includes a rib extending along the first and second portions and disposed in the u-shape thereof, said rib having struts, said rib, struts and first and second portions being one continuous piece.

12. A ladder as described in claim 8 including a clip attached to the first portion or the second portion which extends therefrom to connect with a clip receiver of another member attached to another rail when the ladder is closed.

13. A ladder as described in claim 8 wherein the second portion includes a guard section that is positioned about the rail to which the second portion is attached to protect the rail.

14. A ladder as described in claim 13 wherein a contact surface of the second portion and the guard section define a pocket therewith to receive the rail bottom.

15. A ladder as described in claim 1 wherein the horizontal element is a step.

16. A ladder comprising:
a first side rail having a first rail flange and a second rail flange and a web which together form a u-shaped cross-section;
a second side rail essentially in parallel with and adjacent to the first side rail, said second rail having a first rail flange and a second rail flange;
a first step connected to the first side rail in proximity to its bottom and connected to the second side rail in proximity to its bottom and essentially perpendicular with the first and second side rails;
a first front member connected to the first side rail and the first step; and
a second front member connected to the second side rail and to the first step, each front member comprising:
a first portion that connects to the first step; and
a second portion which connects to the respective side rail and extends essentially in parallel with the respective side rail, said second portion integrally connected to the first portion such that the first portion and second portion are one continuous piece, said second portion in angular relationship with said first portion, said second portion has a contact surface which contacts respective web of the rail and extends along and conforms with the rail to which it is attached so forces can be transferred therebetween,
a first arm which connects to the respective first rail flange and the first step and extends between the first portion and the second portion;
a second arm which connects to the respective second rail flange and the first step and extends between the first portion and the second portion;
a central body which is integrally connected to the second arm and the first arm, said first arm, second arm and central body being one continuous piece and forming a u-shaped cross-section, said central body being the contact surface; and
a cross plate connected perpendicularly with the first arm and the second arm, said first arm, second arm, cross plate and central body being one continuous piece.

17. A ladder as described in claim 16 wherein the first side rail, second side rail, first step, first member and second member define a front section; and including a third side rail;
a fourth side rail essentially in parallel with and adjacent to the third side rail;
a first horizontal element connected to the third side rail in proximity to its bottom and connected to the fourth side rail in proximity to its bottom;
a first rear member connected to the third rail and to the first horizontal element;
a second rear member connected to the fourth side rail and to the first horizontal element, each rear member comprising:
a first portion that connects to the horizontal element; and
a second portion which connects to the respective third and fourth rail and extends essentially in parallel with the respective third and fourth rail;
the third side rail, fourth side rail, first horizontal element, first rear member and second rear member define a rear section; and
a ladder top to which the first rail top, second rail top, third rail top and fourth rail top are connected, said ladder top, front section and rear section forming a stepladder.

18. A ladder as described in claim 17 wherein the front section includes at least a second step connected to the first and second side rails at a location closer to the first side rail top and second side rail top than the first step's location relative to the respective tops.

19. A ladder as described in claim 18 wherein the rear section includes at least a second horizontal connected to the third and fourth side rails at a location closer to the third side rail top and fourth side rail top than the first horizontal is located relative to the respective tops.

20. A ladder as described in claim 16 wherein the horizontal element is a step.

21. A method for using a ladder comprising the steps of:

placing a load on the ladder;

transferring forces generated from the load to a member connected between a rail of the ladder and a first step of the ladder through a cross plate of the member oriented perpendicularly with the rail, said member having a first portion that connects to the first step; and a second portion which connects to the rail and extends essentially in parallel with the rail of the ladder, said second portion integrally connected to the first portion such that the first portion and second portion are one continuous piece, said second portion in angular relationship with said first portion, the rail and member each respectively having first and second flanges joined by a web which together form u-shaped cross-sections, the flanges and web of the member mate and contact with respective flanges and web of the rail and extends along and conforms with the rail to which it is attached so forces can be transferred therebetween.

* * * * *